(12) United States Patent
Sugano

(10) Patent No.: US 7,165,022 B2
(45) Date of Patent: Jan. 16, 2007

(54) CHINESE LANGUAGE INPUT SYSTEM

(75) Inventor: Jin Sugano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 941 days.

(21) Appl. No.: 10/164,010

(22) Filed: Jun. 7, 2002

(65) Prior Publication Data

US 2002/0193984 A1    Dec. 19, 2002

Related U.S. Application Data

(63) Continuation-in-part of application No. 09/968,010, filed on Oct. 2, 2001.

(30) Foreign Application Priority Data

Jan. 15, 2002    (JP) .............................. 2002-005780

(51) Int. Cl.
*G06F 17/20*    (2006.01)
(52) U.S. Cl. .................... 704/8; 704/7; 704/3; 715/535
(58) Field of Classification Search ............... 704/2–8; 715/535

See application file for complete search history.

(56) References Cited

U.S. PATENT DOCUMENTS

| | | | | |
|---|---|---|---|---|
| 5,331,557 A | * | 7/1994 | Liu ............................ | 715/535 |
| 5,562,078 A | * | 10/1996 | Dzwonkiewicz ....... | 128/207.18 |
| 5,786,776 A | * | 7/1998 | Kisaichi et al. ............... | 341/23 |
| 6,307,541 B1 | * | 10/2001 | Ho et al. ..................... | 345/171 |
| 6,356,258 B1 | * | 3/2002 | Kato et al. ................... | 345/168 |
| 6,562,078 B1 | * | 5/2003 | Yang et al. ................. | 715/535 |
| 6,809,725 B1 | * | 10/2004 | Zhang ......................... | 345/171 |
| 6,982,658 B1 | * | 1/2006 | Guo ............................ | 341/28 |

OTHER PUBLICATIONS

U.S. Appl. No. 09/968,010, filed Oct. 2, 2001, Jin Sugano.

* cited by examiner

*Primary Examiner*—Abul Azad
*Assistant Examiner*—Lamont Spooner
(74) *Attorney, Agent, or Firm*—Staas & Halsey LLP

(57) ABSTRACT

Initials of the Chinese language are classified into nine initial groups. The first touch of a numeric key of a cellular phone selects an initial group including the initial of the desired syllable for input. Then, guidance is displayed corresponding to a final group to which the final of the desired syllable belongs. The syllable is determined based on the operation according to the guidance. The present invention classifies finals into the first final group composed of simple finals, the second final group composed of complex finals that start with a, e, or o, the third final group composed of complex finals that start with i, or y, the fourth final group composed of complex finals that start with u, or w, and the fifth final group composed of complex finals that start with v, or yu.

12 Claims, 40 Drawing Sheets

| CAP1 | CAP2 | CAP3 |
|------|------|------|
| SML1 | SML2 | SML3 |
| SYM1 | SYM2 | SYM3 |
| DBL/SGL | NUM | |

FIG. 3

| 1 | 2 | 3 |
|---|---|---|
| 4 | 5 | 6 |
| 7 | 8 | 9 |
| * | 0 | # |

| bp | mf | dt |
|----|----|----|
| nl | gkh | jzhz |
| qchc | xshs | ryw |
| | SYM | |

| button | alternative | pointer |
|---|---|---|
| 1 | b ? | D 1 1 |
| 2 | b * | D 1 2 |
| ⋮ | | ⋮ |
| 9 | | D 1 9 |

D2

| button | alternative | pointer |
|---|---|---|
| 1 | m ? | D 2 1 |
| 2 | m * | D 2 2 |
| ⋮ | | ⋮ |
| 9 | | D 2 9 |

⋮

D9

| button | alternative | pointer |
|---|---|---|
| 1 | r ? | D 9 1 |
| 2 | r * | D 9 2 |
| ⋮ | | ⋮ |
| 9 | | D 9 9 |

| b? | b* | bi* |
|---|---|---|
| p? | p* | pi* |
|  |  |  |
|  |  |  |

(D2)···mf

| m? | m* | mi* |
|---|---|---|
| f? | f* |  |
|  |  |  |
|  |  |  |

(D3)···dt

| d? | d* | di* |
|---|---|---|
| du* | t? | t* |
| ti* | tu* |  |
|  |  |  |

(D4)···nl

| n? | n* | ni* |
|---|---|---|
| nu/v* | l? | l* |
| li* | lu/v* |  |
|  |  |  |

(D5)···gkh

| g? | g* | gu* |
|---|---|---|
| k? | k* | ku* |
| h? | h* | hu* |
|  |  |  |

(D6)···jzhz

| j? | ji* | ju* |
|---|---|---|
| zh? | zh* | zhu* |
| z? | z* | zu* |
|  |  |  |

(D7)···qchc

| q? | qi* | qu* |
|---|---|---|
| ch? | ch* | chu* |
| c? | c* | cu* |
|  |  |  |

(D8)···xshs

| x? | xi* | xu* |
|---|---|---|
| sh? | sh* | shu* |
| s? | s* | su* |
|  |  |  |

(D9)···ryw

| r? | r* | ru* |
|---|---|---|
| ? | * | y* |
| w* | yu* |  |
|  |  |  |

| button | final | syllable |
|---|---|---|
| 1 | a | b a |
| 2 | o | b o |
|  |  |  |
| 0 |  |  |

D12

| button | final | syllable |
|---|---|---|
| 1 | a i | b a i |
| 2 | e i | b e i |
|  |  |  |
| 0 |  |  |

⋮

D19

| button | final | syllable |
|---|---|---|
| 1 |  |  |
| 2 |  |  |
|  |  |  |
| 0 |  |  |

D91

| button | final | syllable |
|---|---|---|
| 1 |  |  |
| 2 |  |  |
|  |  |  |
| 0 |  |  |

D92

| button | final | syllable |
|---|---|---|
| 1 |  |  |
| 2 |  |  |
|  |  |  |
| 0 |  |  |

⋮

D99

| button | final | syllable |
|---|---|---|
| 1 |  |  |
| 2 |  |  |
|  |  |  |
| 0 |  |  |

| ba | bo | |
|---|---|---|
| bi | bu | |
| | | |
| | | |

(D12)···b*

| bai | bei | bao |
|---|---|---|
| | ban | ben |
| bang | beng | |
| | | |

(D13)···bi*

| | bie | biao |
|---|---|---|
| | bian | bin |
| | bing | |
| | | |

(D14)···p?

| pa | po | |
|---|---|---|
| pi | pu | |
| | | |
| | | |

(D15)···p*

| pai | pei | pao |
|---|---|---|
| pou | pan | pen |
| pang | peng | |
| | | |

(D16)···pi*

| | pie | piao |
|---|---|---|
| | pian | pin |
| | ping | |
| | | |

| ma | mo | me |
|---|---|---|
| mi | mu |  |
|  |  |  |
|  | m |  |

(D22)···m*

| mai | mei | mao |
|---|---|---|
| mou | man | men |
| mang | meng |  |
|  |  |  |

(D23)···mi*

|  | mie | miao |
|---|---|---|
| miu | mian | min |
|  | ming |  |
|  |  |  |

(D24)···f?

| fa | fo |  |
|---|---|---|
|  | fu |  |
|  |  |  |
|  |  |  |

(D25)···f*

|  | fei |  |
|---|---|---|
| fou | fan | fen |
| fang | feng |  |
|  |  |  |

| da |  | de |
|---|---|---|
| di | du |  |
|  |  |  |
|  |  |  |

(D32)···d*

| dai | dei | dao |
|---|---|---|
| dou | dan |  |
| dang | deng | dong |
|  |  |  |

(D33)···di*

| dia | die | diao |
|---|---|---|
| diu | dian |  |
|  | ding |  |
|  |  |  |

(D34)···du*

|  | duo |  |
|---|---|---|
| dui | duan | dun |
|  | (dong) |  |
|  |  |  |

(D35)···t?

| ta |  | te |
|---|---|---|
| ti | tu |  |
|  |  |  |
|  |  |  |

(D36)···t*

| tai | tei | tao |
|---|---|---|
| tou | tan |  |
| tang | teng | tong |
|  |  |  |

(D37)···ti*

|  | tie | tiao |
|---|---|---|
|  | tian |  |
|  | ting |  |
|  |  |  |

(D38)···tu*

|  | tuo |  |
|---|---|---|
| tui | tuan | tun |
|  | (tong) |  |
|  |  |  |

| na  |     | ne  |
|-----|-----|-----|
| ni  | nu  | nv  |
|     |     |     |
|     | n   |     |

(D42)···n*

| nai  | nei  | nao  |
|------|------|------|
| nou  | nan  | nen  |
| nang | neng | nong |
|      |      |      |

(D43)···ni*

|       | nie  | niao |
|-------|------|------|
| niu   | nian | nin  |
| niang | ning |      |
|       |      |      |

(D44)···nu/v*

|     | nuo    |     |
|-----|--------|-----|
| nve | nuan   |     |
|     | (nong) |     |
|     |        |     |

(D45)···l?

| la | lo | le |
|----|----|----|
| li | lu | lv |
|    |    |    |
|    |    |    |

(D46)···l*

| lai  | lei  | lao  |
|------|------|------|
| lou  | lan  |      |
| lang | leng | long |
|      |      |      |

(D47)···li*

| lia   | lie  | liao |
|-------|------|------|
| liu   | lian | lin  |
| liang | ling |      |
|       |      |      |

(D48)···lu/v*

|     | luo    |     |
|-----|--------|-----|
| lve | luan   | lun |
|     | (long) |     |
|     |        |     |

| ga |  | ge |
|---|---|---|
|  | gu |  |
|  |  |  |
|  |  |  |

(D52)···g*

| gai | gei | gao |
|---|---|---|
| gou | gan | gen |
| gang | geng | gong |
|  |  |  |

(D53)···gu*

| gua | guo | guai |
|---|---|---|
| gui | guan | gun |
| guang | (gong) |  |
|  |  |  |

(D54)···k?

| ka |  | ke |
|---|---|---|
|  | ku |  |
|  |  |  |
|  |  |  |

(D55)···k*

| kai | kei | kao |
|---|---|---|
| kou | kan | ken |
| kang | keng | kong |
|  |  |  |

(D56)···ku*

| kua | kuo | kuai |
|---|---|---|
| kui | kuan | kun |
| kuang | (kong) |  |
|  |  |  |

(D57)···h?

| ha |  | he |
|---|---|---|
|  | hu |  |
|  |  |  |
|  |  |  |

(D58)···h*

| hai | hei | hao |
|---|---|---|
| hou | han | hen |
| hang | heng | hong |
|  | hng |  |

(D59)···hu*

| hua | huo | huai |
|---|---|---|
| hui | huan | hun |
| huang | (hong) |  |
|  |  |  |

|  |  |  |
|---|---|---|
| ji | ju | (ju) |
|  |  |  |
|  |  |  |

(D62)···ji*

| jia | jie | jiao |
|---|---|---|
| jiu | jian | jin |
| jiang | jing | jiong |
|  |  |  |

(D63)···ju*

|  |  |  |
|---|---|---|
| jue | juan | jun |
|  | (jiong) |  |
|  |  |  |

(D64)···zh?

| zha |  | zhe |
|---|---|---|
| zhi | zhu |  |
| (zhi) |  |  |
|  |  |  |

(D65)···zh*

| zhai | zhei | zhao |
|---|---|---|
| zhou | zhan | zhen |
| zhang | zheng | zhong |
|  |  |  |

(D66)···zhu*

| zhua | zhuo | zhuai |
|---|---|---|
| zhui | zhuan | zhun |
| zhuang | (zhong) |  |
|  |  |  |

(D67)···z?

| za |  | ze |
|---|---|---|
| zi | zu |  |
| (zi) |  |  |
|  |  |  |

(D68)···z*

| zai | zei | zao |
|---|---|---|
| zou | zan | zen |
| zang | zeng | zong |
|  |  |  |

(D69)···zu*

|  | zuo |  |
|---|---|---|
| zui | zuan | zun |
|  | (zong) |  |
|  |  |  |

|    |    |      |
|----|----|------|
| qi | qu | (qu) |
|    |    |      |
|    |    |      |

(D72)···qi*

|       |      |       |
|-------|------|-------|
| qia   | qie  | qiao  |
| qiu   | qian | qin   |
| qiang | qing | qiong |
|       |      |       |

(D73)···qu*

|     |         |     |
|-----|---------|-----|
| que | quan    | qun |
|     | (qiong) |     |
|     |         |     |

(D74)···ch?

|       |     |     |
|-------|-----|-----|
| cha   |     | che |
| chi   | chu |     |
| (chi) |     |     |
|       |     |     |

(D75)···ch*

|       |       |       |
|-------|-------|-------|
| chai  |       | chao  |
| chou  | chan  | chen  |
| chang | cheng | chong |
|       |       |       |

(D76)···chu*

|        |         |       |
|--------|---------|-------|
|        | chuo    | chuai |
| chui   | chuan   | chun  |
| chuang | (chong) |       |
|        |         |       |

(D77)···c?

|      |    |    |
|------|----|----|
| ca   |    | ce |
| ci   | cu |    |
| (ci) |    |    |
|      |    |    |

(D78)···c*

|      |      |      |
|------|------|------|
| cai  |      | cao  |
| cou  | can  | cen  |
| cang | ceng | cong |
|      |      |      |

(D79)···cu*

|     |        |     |
|-----|--------|-----|
|     | cuo    |     |
| cui | cuan   | cun |
|     | (cong) |     |
|     |        |     |

|  |  |  |
|---|---|---|
| xi | xu | (xu) |
|  |  |  |
|  |  |  |

(D82)···xi*

| xia | xie | xiao |
|---|---|---|
| xiu | xian | xin |
| xiang | xing | xiong |
|  |  |  |

(D83)···xu*

|  |  |  |
|---|---|---|
| xue | xuan | xun |
|  | (xiong) |  |
|  |  |  |

(D84)···sh?

| sha |  | she |
|---|---|---|
| shi | shu |  |
| (shi) |  |  |
|  |  |  |

(D85)···sh*

| shai | shei | shao |
|---|---|---|
| shou | shan | shen |
| shang | sheng |  |
|  |  |  |

(D86)···shu*

| shua | shuo | shuai |
|---|---|---|
| shui | shuan | shun |
| shuang |  |  |
|  |  |  |

(D87)···s?

| sa |  | se |
|---|---|---|
| si | su |  |
| (si) |  |  |
|  |  |  |

(D88)···s*

| sai |  | sao |
|---|---|---|
| sou | san | sen |
| sang | seng | song |
|  |  |  |

(D89)···su*

|  | suo |  |
|---|---|---|
| sui | suan | sun |
|  | (song) |  |
|  |  |  |

|  |  | re |
|---|---|---|
| ri | ru |  |
| (ri) |  |  |
|  |  |  |

(D92)···r*

|  |  | rao |
|---|---|---|
| rou | ran | ren |
| rang | reng | rong |
|  |  |  |

(D93)···ru*

|  | ruo |  |
|---|---|---|
| rui | ruan | run |
|  | (rong) |  |
|  |  |  |

(D94)···?

| a | o | e |
|---|---|---|
| yi | wu | yu |
| ê |  |  |
|  | er |  |

(D95)···*

| ai | ei | ao |
|---|---|---|
| ou | an | en |
| ang | eng | ong |
|  | ng |  |

(D96)···y*

| ya | ye | yao |
|---|---|---|
| you | yan | yin |
| yang | ying | yong |
|  | yo |  |

(D97)···w*

| wa | wo | wai |
|---|---|---|
| wei | wan | wen |
| wang | weng |  |
|  |  |  |

(D98)···yu*

|  |  |  |
|---|---|---|
| yue | yuan | yun |
|  | (yong) |  |
|  |  |  |

FIG. 20

| syllable | initial selecting stage | initial-final selecting stage | final selecting stage |
|---|---|---|---|
| m | m f | m ? | exception ( 0 ) |
| n | n l | n ? | exception ( 0 ) |
| h n g | g k h | h * | exception ( 0 ) |
| n g | r y w | * | exception ( 0 ) |
| y o | r y w | y * | exception ( 0 ) |

FIG. 21

| bp | mf | dt |
|----|----|----|
| nl | gkh | jzhz |
| qchc | xshs | rø |
| CNV | SYM | EDT |

FIG. 27

*bp selected*

| b  | ba | bo |
|----|----|----|
| bi | bu | p  |
| pa | po | pi |
|    | pu |    |

*mf selected*

| m  | ma | mo |
|----|----|----|
| me | mi | mu |
| f  | fa | fo |
|    | fu |    |

*dt selected*

| d  | da | de |
|----|----|----|
| di | du | t  |
| ta | te | ti |
|    | tu |    |

*nl selected*

| n  | na | ne    |
|----|----|-------|
| ni | nu | nv    |
| l  | la | le/lo |
| li | lu | lv    |

*gkh selected*

| g  | ga | ge |
|----|----|----|
| gu | k  | ka |
| ke | ku | h  |
| ha | he | hu |

*jzhz selected*

| ji  | ju  | j/zh |
|-----|-----|------|
| zha | zhe | zhi  |
| zhu | z   | za   |
| ze  | zi  | zu   |

*qchc selected*

| qi  | qu  | q/ch |
|-----|-----|------|
| cha | che | chi  |
| chu | c   | ca   |
| ce  | ci  | cu   |

*xshs selected*

| xi  | xu  | x/sh |
|-----|-----|------|
| sha | she | shi  |
| shu | s   | sa   |
| se  | si  | su   |

*rø selected*

| r   | re  | ri  |
|-----|-----|-----|
| ru  | '   | a   |
| o/ê | e   | yi  |
| wu  | yu  | er  |

*SYM selected*

| 常標 | 算符 | 引括 |
|------|------|------|
| 書括 | 形符 | 特符 |
| 數点 | 數括 | 數圈 |
| 空格 | 數字 | 全半 |

FIG. 28

"bp" is selected at first keystroke

*(0) Initial Group*

| bp | mf | dt |
|---|---|---|
| nl | gkh | jzhz |
| qchc | xshs | r∅ |
| CNV | SYM | EDT |

*(1) Smpl. Slbl./Cmp. Fnl.*

| b | ba | bo |
|---|---|---|
| bi | bu | p |
| pa | po | pi |
|  | pu |  |

*(2) b selected*

| bai | bei | bao |
|---|---|---|
|  | ban | ben |
| bang | beng |  |
|  | 0 |  |

*(2) p selected*

| pai | pei | pao |
|---|---|---|
| pou | pan | pen |
| pang | peng |  |
|  | 0 |  |

*(3) b+i selected*

|  | bie | biao |
|---|---|---|
|  | bian | bin |
|  | bing |  |
|  |  |  |

*(3) p+i selected*

|  | pie | piao |
|---|---|---|
|  | pian | pin |
|  | ping |  |
|  |  |  |

"mf" is selected at first keystroke (0) Initial Group

| bp | mf | dt |
|---|---|---|
| nl | gkh | jzhz |
| qchc | xshs | rø |
| CNV | SYM | EDT |

(1) Smpl. Slbl./Cmp. Fnl.

| m | ma | mo |
|---|---|---|
| me | mi | mu |
| f | fa | fo |
|  | fu |  |

(2) m selected

| mai | mei | mao |
|---|---|---|
| mou | man | men |
| mang | meng |  |
|  | 0 |  |

(2) f selected

|  | fei |  |
|---|---|---|
| fou | fan | fen |
| fang | feng |  |
|  | 0 |  |

(3) m+i selected

|  | mie | miao |
|---|---|---|
| miu | mian | min |
|  | ming |  |
|  |  |  |

"dt" is selected at first keystroke (0) Initial Group

| bp | mf | dt |
|---|---|---|
| nl | gkh | jzhz |
| qchc | xshs | rø |
| CNV | SYM | EDT |

(1) Smpl. Slbl./Cmp. Fnl.

| d | da | de |
|---|---|---|
| di | du | t |
| ta | te | ti |
|  | tu |  |

(2) d selected

| dai | dei | dao |
|---|---|---|
| dou | dan |  |
| dang | deng | dong |
|  | 0 |  |

(2) t selected

| tai | tei | tao |
|---|---|---|
| tou | tan |  |
| tang | teng | tong |
|  | 0 |  |

(3) d+i selected

| dia | die | diao |
|---|---|---|
| diu | dian |  |
|  | ding |  |
|  |  |  |

(3) t+i selected

|  | tie | tiao |
|---|---|---|
|  | tian |  |
|  | ting |  |
|  |  |  |

(3) d+u selected

|  | duo |  |
|---|---|---|
| dui | duan | dun |
|  | (dong) |  |
|  |  |  |

(3) t+u selected

|  | tuo |  |
|---|---|---|
| tui | tuan | tun |
|  | (tong) |  |
|  |  |  |

"nl" is selected at first keystroke (0)Initial Group

| bp | mf | dt |
|---|---|---|
| nl | gkh | jzhz |
| qchc | xshs | rø |
| CNV | SYM | EDT |

(1)Smpl. Sibl./Cmp. Fnl.

| n | na | ne |
|---|---|---|
| ni | nu | nv |
| l | la | le/lo |
| li | lu | lv |

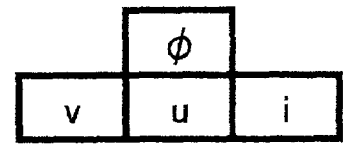

(2)n selected

| nai | nei | nao |
|---|---|---|
| nou | nan | nen |
| nang | neng | nong |
| 0 | | |

(2)l selected

| lai | lei | lao |
|---|---|---|
| lou | lan | |
| lang | leng | long |
| 0 | | |

(3)n+i selected

| | nie | niao |
|---|---|---|
| niu | nian | nin |
| niang | ning | |
| | | |

(3)l+i selected

| lia | lie | liao |
|---|---|---|
| liu | lian | lin |
| liang | ling | |
| | | |

(3)n+u selected

| | nuo | |
|---|---|---|
| nue | nuan | |
| | (nong) | |
| | | |

(3)l+u selected

| | luo | |
|---|---|---|
| lue | luan | lun |
| | (long) | |
| | | |

(3)n+v selected

| | | |
|---|---|---|
| nve | | |
| | | |
| | | |

(3)l+v selected

| | | |
|---|---|---|
| lve | | |
| | | |
| | | |

FIG. 32

"gkh" is selected at first keystroke (0) Initial Group

| bp | mf | dt |
|---|---|---|
| nl | gkh | jzhz |
| qchc | xshs | rø |
| CNV | SYM | EDT |

(1) Smpl. Slbl./Cmp. Fnl.

| g | ga | ge |
|---|---|---|
| gu | k | ka |
| ke | ku | h |
| ha | he | hu |

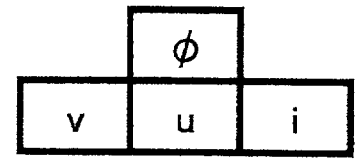

(2) g selected

| gai | gei | gao |
|---|---|---|
| gou | gan | gen |
| gang | geng | gong |
|  | 0 |  |

(2) k selected

| kai | kei | kao |
|---|---|---|
| kou | kan | ken |
| kang | keng | kong |
|  | 0 |  |

(2) h selected

| hai | hei | hao |
|---|---|---|
| hou | han | hen |
| hang | heng | hong |
|  | 0 |  |

| | | |
|---|---|---|
| | | |
| | | |
| | | |
| | | |

| | | |
|---|---|---|
| | | |
| | | |
| | | |
| | | |

| | | |
|---|---|---|
| | | |
| | | |
| | | |
| | | |

(3) g+u selected

| gua | guo | guai |
|---|---|---|
| gui | guan | gun |
| guang | (gong) |  |
|  |  |  |

(3) k+u selected

| kua | kuo | kuai |
|---|---|---|
| kui | kuan | kun |
| kuang | (kong) |  |
|  |  |  |

(3) h+u selected

| hua | huo | huai |
|---|---|---|
| hui | huan | hun |
| huang | (hong) |  |
|  |  |  |

FIG. 33

"jzhz" is selected at first keystroke (0)Initial Group

| bp | mf | dt |
|---|---|---|
| nl | gkh | jzhz |
| qchc | xshs | rø |
| CNV | SYM | EDT |

(1)Smpl. Slbl./Cmp. Fnl.

| ji | ju | j/zh |
|---|---|---|
| zha | zhe | zhi |
| zhu | z | za |
| ze | zi | zu |

|  | ø |  |
|---|---|---|
| v | u | i |

(2)j/zh selected

| zhai | zhei | zhao |
|---|---|---|
| zhou | zhan | zhen |
| zhang | zheng | zhong |
|  | 0 |  |

(2)z selected

| zai | zei | zao |
|---|---|---|
| zou | zan | zen |
| zang | zeng | zong |
|  | 0 |  |

(3)j/zh+i選択時

| jia | jie | jiao |
|---|---|---|
| jiu | jian | jin |
| jiang | jing | jiong |
|  |  |  |

(3)j/zh+u選択時

| zhua | zhuo | zhuai |
|---|---|---|
| zhui | zhuan | zhun |
| zhuang | (zhong) |  |
|  |  |  |

(3)z+u選択時

|  | zuo |  |
|---|---|---|
| zui | zuan | zun |
|  | (zong) |  |
|  |  |  |

(3)j/zh+v選択時

|  |  |  |
|---|---|---|
| jue | juan | jun |
|  | (jiong) |  |
|  |  |  |

FIG. 34

"qchc" is selected at first keystroke (0) Initial Group

| bp | mf | dt |
|---|---|---|
| nl | gkh | jzhz |
| qchc | xshs | rø |
| CNV | SYM | EDT |

(1) Smpl. Slbl./Cmp. Fnl.

| qi | qu | q/ch |
|---|---|---|
| cha | che | chi |
| chu | c | ca |
| ce | ci | cu |

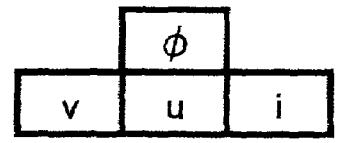

(2) q/ch selected

| chai |  | chao |
|---|---|---|
| chou | chan | chen |
| chang | cheng | chong |
|  | 0 |  |

(2) c selected

| cai |  | cao |
|---|---|---|
| cou | can | cen |
| cang | ceng | cong |
|  | 0 |  |

(3) q/ch+i selected

| qia | qie | qiao |
|---|---|---|
| qiu | qian | qin |
| qiang | qing | qiong |
|  |  |  |

(3) q/ch+u selected

|  | chuo | chuai |
|---|---|---|
| chui | chuan | chun |
| chuang | (chong) |  |
|  |  |  |

(3) c+u selected

|  | cuo |  |
|---|---|---|
| cui | cuan | cun |
|  | (cong) |  |
|  |  |  |

(3) q/ch+v selected

| que | quan | qun |
|---|---|---|
|  | (qiong) |  |
|  |  |  |
|  |  |  |

FIG. 35

"xshs" is selected at first keystroke (0) Initial Group

| bp | mf | dt |
|---|---|---|
| nl | gkh | jzhz |
| qchc | xshs | rø |
| CNV | SYM | EDT |

(1) Smpl. Slbl./Cmp. Fnl.

| xi | xu | x/sh |
|---|---|---|
| sha | she | shi |
| shu | s | sa |
| se | si | su |

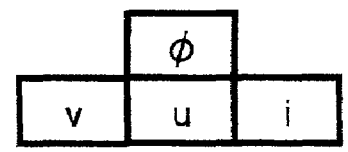

(2) x/sh selected

| shai | shei | shao |
|---|---|---|
| shou | shan | shen |
| shang | sheng | |
| | 0 | |

(2) s selected

| sai | | sao |
|---|---|---|
| sou | san | sen |
| sang | seng | song |
| | 0 | |

(3) x/sh+i selected

| xia | xie | xiao |
|---|---|---|
| xiu | xian | xin |
| xiang | xing | xiong |
| | | |

(3) x/sh+u selected

| shua | shuo | shuai |
|---|---|---|
| shui | shuan | shun |
| shuang | | |
| | | |

(3) s+u selected

| | suo | |
|---|---|---|
| sui | suan | sun |
| | (song) | |
| | | |

(3) x/sh+v selected

| | | |
|---|---|---|
| xue | xuan | xun |
| | (xiong) | |
| | | |

FIG. 36

"rɸ" is selected at first keystroke (0) Initial Group

| bp | mf | dt |
|---|---|---|
| nl | gkh | jzhz |
| qchc | xshs | rɸ |
| CNV | SYM | EDT |

(1) Smpl. Slbl./Cmp. Fnl.

| r | re | ri |
|---|---|---|
| ru | ' | a |
| o/ê | e | yi |
| wu | yu | er |

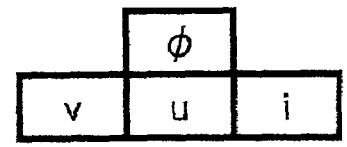

(2) r selected

|  |  | rao |
|---|---|---|
| rou | ran | ren |
| rang | reng | rong |
|  | 0 |  |

(2) ' selected

| ai | ei | ao |
|---|---|---|
| ou | an | en |
| ang | eng | ong |
|  | 0 |  |

(3) ' +i selected

| ya | ye | yao |
|---|---|---|
| you | yan | yin |
| yang | ying | yong |
|  |  |  |

|  |  |  |
|---|---|---|
|  |  |  |
|  |  |  |
|  |  |  |

(3) r+u selected

|  | ruo |  |
|---|---|---|
| rui | ruan | run |
|  | (rong) |  |
|  |  |  |

(3) ' +u selected

| wa | wo | wai |
|---|---|---|
| wei | wan | wen |
| wang | weng |  |
|  |  |  |

(3) ' +v selected

|  |  |  |
|---|---|---|
| yue | yuan | yun |
|  | (yong) |  |
|  |  |  |

FIG. 37

- Switch between Phonetic input and Conversion Modes

- Switch between Phonetic input and Document Edit Modes (dt selected)
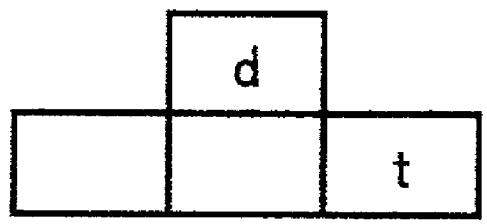
(gkh selected)
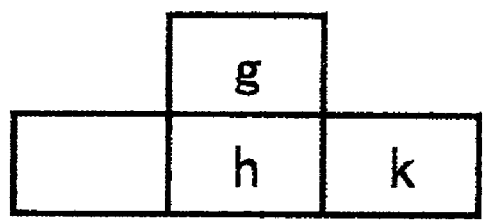
(jzhz selected)
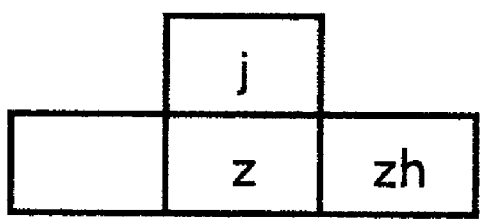
(rϕ selected)
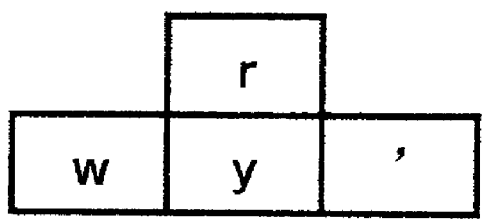
FIG. 44

CHINESE LANGUAGE INPUT SYSTEM

CROSS-REFERENCE TO RELATED APPLICATIONS

This application is a continuation-in-part of U.S. patent application Ser. No. 09/968,010, filed on Oct. 2, 2001, which in turn claims conventional priority of Japanese Patent application No. 2001-179120, disclosures of which are incorporated herein by reference. The subject matter contained in Japanese Patent application No. 2002-5780, filed on Jan. 15, 2002, is also incorporated herein by reference.

BACKGROUND OF THE INVENTION

1. Field of the Invention

This invention relates to a system for inputting the Chinese language via limited number of keys.

2. Description of the Related Art

Among conventionally known methods for inputting Chinese words is one in which Chinese syllables are entered in Pinyin and then converted into Chinese characters. Every Chinese character is composed of a single syllable, which is transcribed into one to six letters of the English alphabet. With a keyboard having 26 keys corresponding to the 26 letters in the English alphabet, the input of a single syllable therefore requires one to six keystrokes.

Chinese phonemes have a dimension of tones. The basic tones in Mandarin Chinese are composed of four types of tones, or first, second, third, and fourth tones. Hereinafter, it is assumed that ones referred to simply as "syllables" include no tonic factor. Syllables including tonic factors will be referred to as "syllables with tones." According to the method, Chinese characters are converted based on "syllables" or "syllables with tones."

A Chinese syllable is divided into two parts, an initial corresponding to a consonant and a final corresponding to a vowel. In this connection, a final may include any semi-vowel (head vowel) preceding its vowel, and any consonant following its vowel. According to another method for input, the initial and final are each input by a single keystroke each so that a total of two keystrokes determine a syllable. The method, however, requires a keyboard having thirty-odd keys for the sake of entering initials and finals.

Aside from the methods using a keyboard with a number of keys as described above, another method has been developed. The method requires only about ten keys, such as those of a numeric keypad. This aims to meet the demands of inputting Chinese words in cellular phones, which have become prevalent in recent years.

In the conventional numeric-key-based input method, a single Chinese character is input by the following manner. The first keystroke selects a group of initials, the second keystroke selects the first letter of a final, and the third keystroke selects final(s). Note that at the third keystroke, some keys are allocated for a plurality of finals each. At the fourth keystroke or after, the user selects a desired one from many Chinese characters whose syllables are defined by selected initials and selected final(s).

However, according to the conventional technology of inputting Chinese characters through some ten keys, three keystrokes are insufficient to define a syllable. That only extracts many alternative syllables. The syllables hence correspond to many characters. Because the number of characters is fatally large, the user must select a desired character from many alternative characters. This procedure is very complicated for the user.

Because the number of syllables used in the standard Mandarin Chinese is around 400, a three-digit sequence number is sufficient to be assigned to every syllable. With this sequence number, another method for input can be presumed. According to the method, three keystrokes, each entering a digit by a numeric key, define a syllable. The method, however, requires the users to memorize every sequence number assigned to the corresponding syllable. This method is out of touch with reality.

SUMMARY OF THE INVENTION

It is an object of the present invention to provide a program product, an apparatus, and a method for defining a Chinese syllable with a small number of keystrokes of a limited number of keys to realize user-friendly input of the Chinese language.

The Chinese language input method according to the present invention employs the following configuration to accomplish the above object. The method comprises a step of narrowing down alternative syllables for input by selecting a final group to which a final of a syllable for input belongs among a first final group including simple finals, a second final group including complex finals which are transcribed such that the first letter is a, e, or o, a third final group including complex finals which are transcribed such that the first letter is i or y, a fourth final group including complex finals which are transcribed such that the first letter is u or w, and a fifth final group including complex finals which are transcribed such that the first letter is v or the first letters are yu.

With the configuration described above, the alternative syllables for input are narrowed down, and the syllable for input is determined efficiently. It is possible that the syllables determined according to the present invention are those corresponding to the Chinese characters prescribed in GB code (GB2312), BIG5 code, or other code systems.

It is preferable that guidance for input with phonetic symbols is displayed on a screen. The phonetic symbols may be used in accordance with Pinyin, Bopomofo, or the Wade system. The program according to the present invention is applicable to various types of information equipment, such as cellular phones and personal digital assistants, each having a microcomputer equivalent to a controller and keys whose number is about 10.

BRIEF DESCRIPTION OF THE DRAWINGS

The invention will be described below in detail with reference to the accompanying drawings, in which:

FIG. 3 is a schematic view of the second displaying part at the alphanumeric input mode;

FIG. 4 is a schematic view of the second displaying part at the alphanumeric input mode;

FIG. 5 is a schematic view of the second displaying part at the Chinese input (selecting an initial) mode according to the first embodiment of the present invention;

FIG. 6 is a table showing syllables used in the standard Mandarin Chinese;

FIG. 9 is a schematic diagram showing initial-final tables according to the first embodiment;

FIG. 10 is a schematic diagram showing views of the second displaying part at the initial-final selecting stage;

FIG. 11 is a schematic diagram showing syllable tables;

FIG. 12 is a schematic diagram showing views of the second displaying part at the final selecting stage;

FIG. 13 is a schematic diagram showing views of the second displaying part at the final selecting stage;

FIG. 14 is a schematic diagram showing views of the second displaying part at the final selecting stage;

FIG. 15 is a schematic diagram showing views of the second displaying part at the final selecting stage;

FIG. 16 is a schematic diagram showing views of the second displaying part at the final selecting stage;

FIG. 17 is a schematic diagram showing views of the second displaying part at the final selecting stage;

FIG. 18 is a schematic diagram showing views of the second displaying part at the final selecting stage;

FIG. 19 is a schematic diagram showing views of the second displaying part at the final selecting stage;

FIG. 20 is a schematic diagram showing views of the second displaying part at the final selecting stage;

FIG. 21 is a schematic diagram showing procedures for inputting special syllables;

FIG. 27 is a schematic diagram showing the initial screen at the Chinese input mode according to the second embodiment of the present invention.

FIG. 28 is a schematic diagram showing a view after the first keystroke according to the second embodiment of the present invention;

FIG. 32 is a schematic diagram showing input of a syllable including complex final according to the second embodiment of the present invention;

FIG. 33 is a schematic diagram showing input of a syllable including complex final according to the second embodiment of the present invention;

FIG. 34 is a schematic diagram showing input of a syllable including complex final according to the second embodiment of the present invention;

FIG. 35 is a schematic diagram showing input of a syllable including complex final according to the second embodiment of the present invention;

FIG. 36 is a schematic diagram showing input of a syllable including complex final according to the second embodiment of the present invention;

FIG. 37 is a schematic diagram showing input of a syllable including complex final according to the second embodiment of the present invention;

FIG. 44 is an explanatory diagram showing assignment of initials to a set of cursor-movement keys.

DETAILED DESCRIPTION OF THE PREFERRED EMBODIMENTS

The present invention will be explained below with reference to the accompanying drawings in accordance with the embodiments.

First Embodiment

Figure 1:
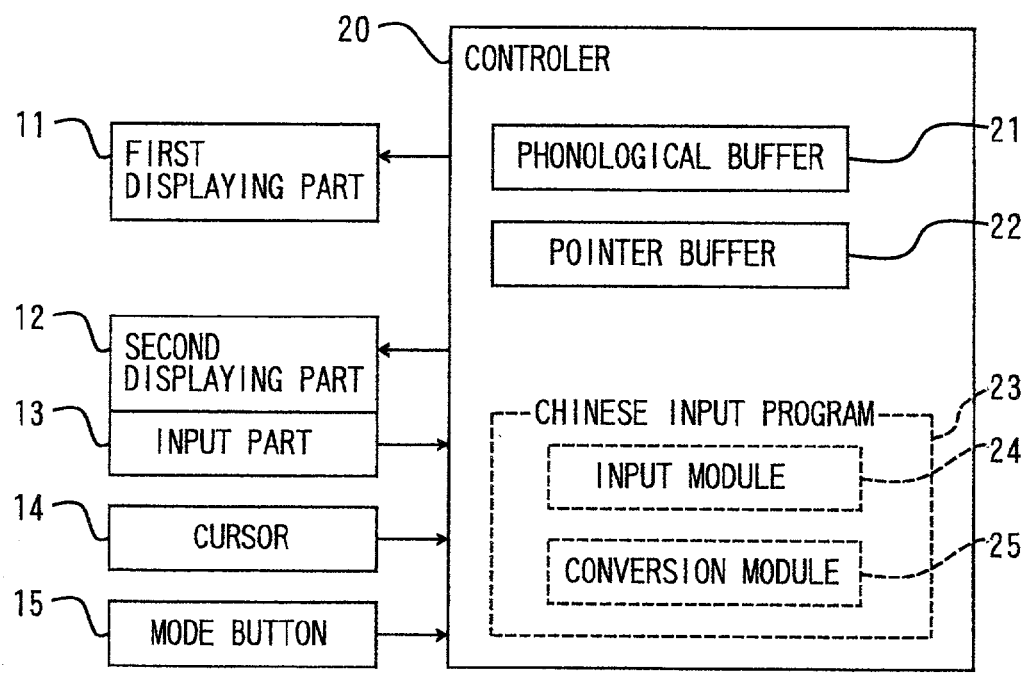
FIG. 1 is a block diagram schematically showing the architecture for input of the Chinese language according to an embodiment of the present invention.
Figure 2:
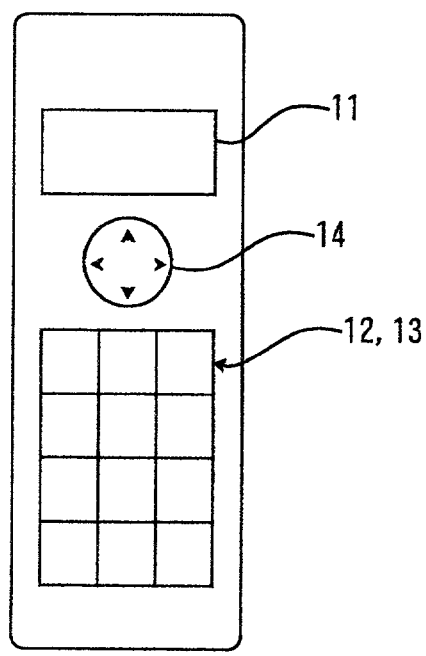
FIG. 2 is a schematic diagram showing the appearance of a cellular phone with a touch pad.

FIG. 1 is a block diagram schematically showing a cellular phone's configuration relating to the process for inputting the Chinese language according to the first embodiment. FIG. 2 is a schematic diagram showing the appearance of the cellular phone.

This cellular phone comprises a first displaying part 11, a second displaying part 12, an input part 13, a cursor (a set of cursor-movement keys) 14, a mode button 15, and a controller 20. The first displaying part 11 is composed of a display device such as a liquid crystal display, and is able to display characters, numerals and other symbols. The second displaying part 12 is composed of a display device such as a liquid crystal display. On the surface of the displaying part 12 the input part 13, which is composed of a transparent touch pad, is provided. The cursor 14 acquires designations toward four directions, or upward, downward, left, and right. The mode button 15 is used for changing input modes. These modes are a phone number mode for inputting a digit with a keystroke, an alphanumeric mode for inputting an alphanumeric letter with two keystrokes, and a Chinese mode for inputting a Chinese character with three keystrokes to be described later.

The controller 20 is connected to each of the first displaying part 11, the second displaying part 12, the input part 13, the cursor 14, and the mode button 15. This controller 20 can display desired letters or characters on the first displaying part 11. The screen of the second displaying part 12 is sectioned into four rows and three columns of rectangular regions. The controller 20 displays desired numerals, other symbols, or characters on the respective rectangular regions.

When the input part 13 is depressed, the controller 20 detects which region at the input part 13 is pressed. This enables the controller 20, when the user presses a region of the input part 13 corresponding to that of the displaying part 12, to detect which region is pressed. Thus, the rectangular regions are used as independent buttons (keys).

The controller 20 further comprises a phonological buffer 21 and a pointer buffer 22, which are capable of storing data. The phonological buffer 21 is used for obtaining input history of the input part 13 in the Chinese mode. The information stored in the buffer 21 is also used for returning the processing to the previous step when a back key is pressed. Further, the controller 20 has a ROM (Read Only Memory) as a storing device in which a Chinese input program 23 is stored. The Chinese input program 23 comprises an input module 24 and a conversion module 25.

This cellular phone has a wireless transmitting and receiving part, a microphone, and a speaker so that the user can make a call as with an ordinary cellular phone. Besides, the user can input text data including alphanumeric letters and Chinese characters into the cellular phone for email.

The alphanumeric letters and the Chinese characters are input at the alphanumeric mode and the Chinese mode, respectively. The user operates the mode button 15 to change the alphanumeric and Chinese modes. The controller 20 acquires the alphanumeric letters in the alphanumeric mode, and the Chinese characters in the Chinese mode.

FIGS. 3 and 4 are schematic views of the second displaying part 12 in the alphanumeric input mode. When the alphanumeric mode is set by the mode button 15 being pushed, the displaying part 12 is set as shown in FIG. 3. When the "NUM" button in the FIG. 3 is pressed, the controller 20 changes the screen to the state shown in FIG. 4. In FIG. 4 the numerals "1," "2," "3," "4," "5," "6," "7," "8," "9" and "0," and symbols "*" and "#" are displayed. Note that in the phone number mode the displaying part 12 is also set as shown in FIG. 4.

FIG. 5 is a schematic view of the second displaying part 12 in the Chinese input mode. Note that FIG. 5 illustrates the displaying part 12 at the initial selecting stage, which will be described later. When the Chinese mode is set by the mode button 15 being pushed, the displaying part 12 enters a state shown in FIG. 5. Then the user can input desired syllables each with three keystrokes.

Figure 6:
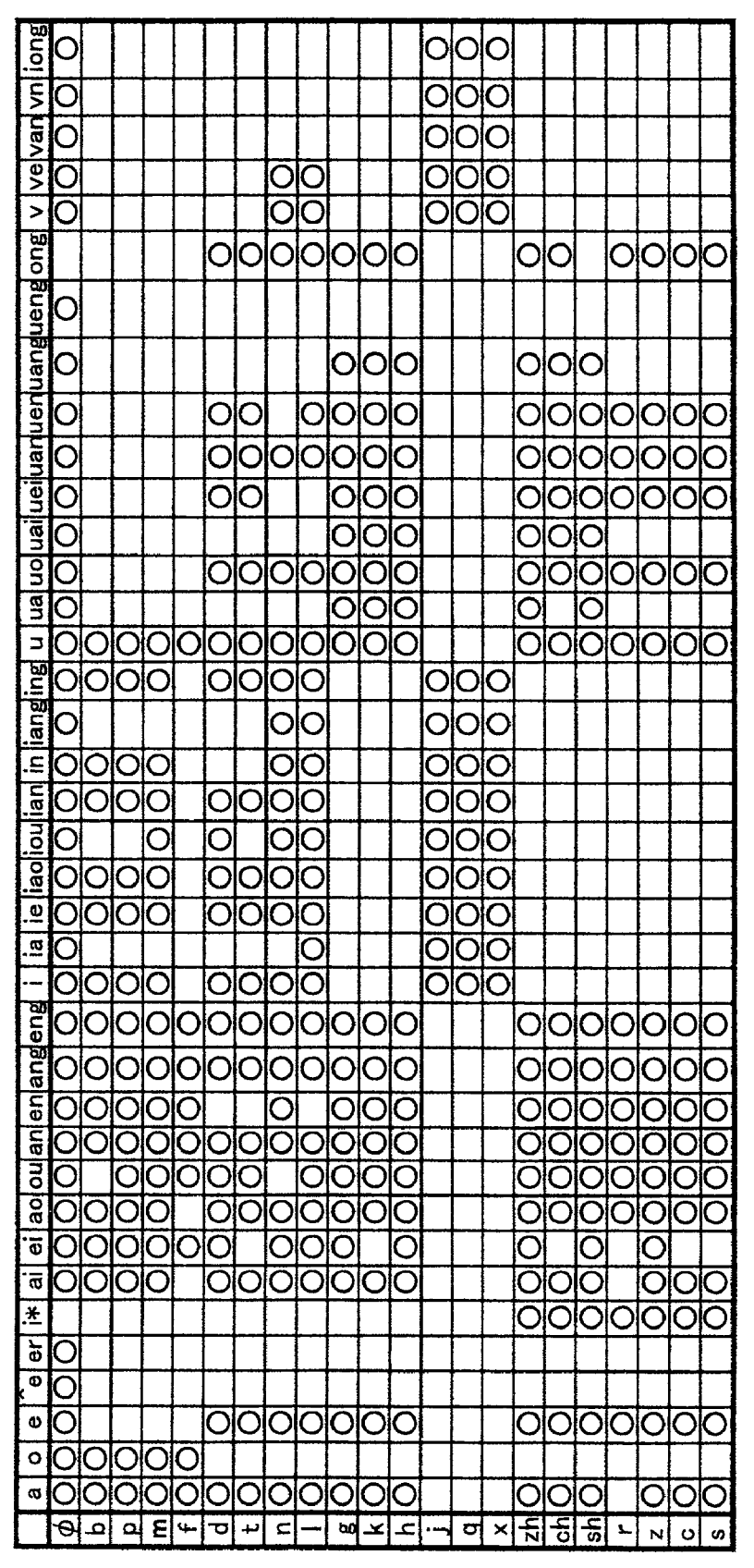

The input of the Chinese language will be described bellow in detail. FIG. 6 is a table of syllables used in the standard Mandarin Chinese. In the table, each row corresponds to an initial, and each column corresponds to a final. A syllable is defined by an initial selected from the rows and a final selected from the columns. Note that the row of the empty set symbol "φ" is for the syllables each composed of a final without any initial. The empty set symbol "φ" corresponds to the zero initial in Chinese phonology.

Not all the syllables given by the combinations of the rows and columns in FIG. 6 are used in the standard Mandarin Chinese. More specifically, among those shown in FIG. 6, only 403 syllables, which are marked with a circle, are used. The syllables in the empty boxes are not in use. Almost every syllable normally used in the standard Mandarin Chinese corresponds to one of those 403 syllables. Nevertheless, there are special syllables for use. The special syllables cannot be transcribed by the combination of a row and a column in FIG. 6. The special syllables are m, n, hng, ng and yo(io). With these special syllables, all the syllables corresponding to the characters prescribed in GB2312 are transcribed if the characters are pronounced in accordance with the standard pronunciation of Mandarin Chinese.

As shown in FIG. 6, Mandarin Chinese has more than 20 initials and more than 30 finals. Consequently, if the input part 13 provides only about 10 keys, a touch of a key is insufficient to specify either an initial or a final.

In the present embodiment, the initials are classified into nine initial groups, and the finals are classified into five final groups. With the first touch of a key, one of the initial groups is selected. With the second touch of a key, an initial is specified and one of the final groups is selected. With the third touch of a key, a final is selected to define a syllable. In other words, a syllable is determined with the first touch (keystroke) corresponding to an initial selecting stage for selecting an initial group, the second touch (keystroke) corresponding to an initial-final selecting stage for both specifying an initial and selecting a final group, and the third touch (keystroke) corresponding to a final selecting stage.

Figure 7:
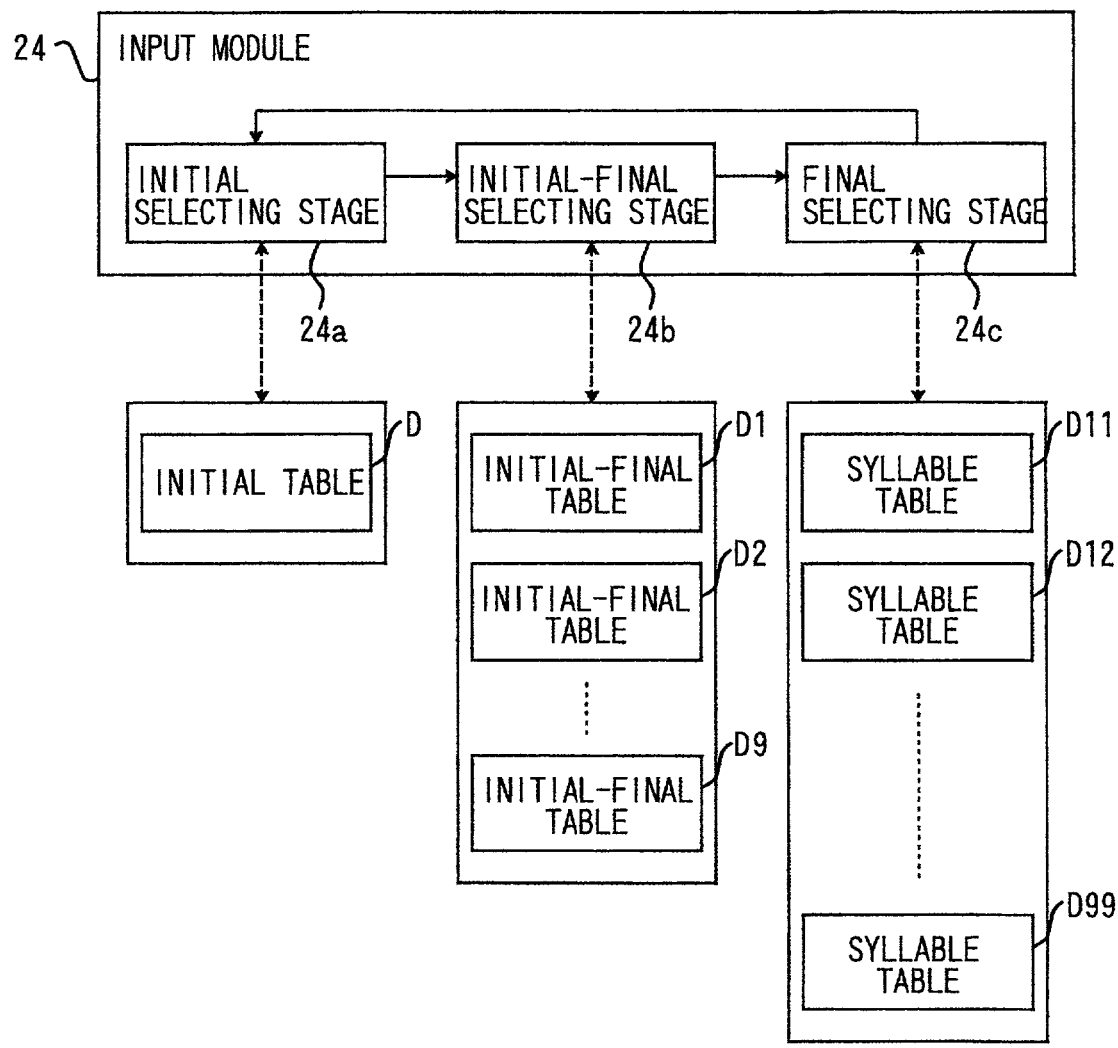
FIG. 7 is a schematic diagram showing the configuration of the input module of the Chinese language input program.

FIG. 7 is a schematic diagram showing the configuration of the input module 24 of the Chinese language input program 23. The input module 24 includes code segments corresponding to the initial selecting stage 24a, the initial-final selecting stage 24b, and the final selecting stage 24c, respectively. The initial selecting stage 24a corresponds to the first presentation step and the initial group specifying step. The initial-final selecting stage 24b corresponds to the second presentation step and the initial-final group specifying step. The final selecting stage 24c corresponds to the third presentation step and the syllable definition step.

Further, there are stored an initial table D, initial-final tables D1–D9, and syllable tables D11–D99 in the ROM of the controller 20. The initial table D is referred at the initial selecting stage 24a, the initial-final tables D1–D9 are referred at the initial-final selecting stage 24b, and the syllable tables D11–D99 are referred at the final selecting stage 24c.

Figure 8:
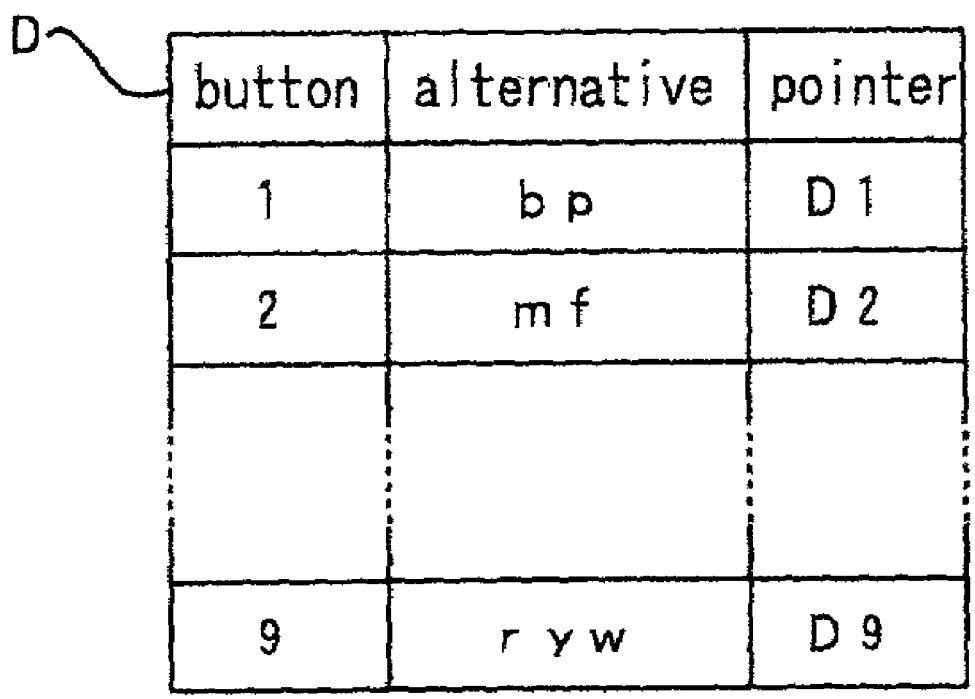
FIG. 8 is a schematic diagram showing the initial table according to the first embodiment.

FIG. 8 is a schematic diagram showing the initial table D, which includes records each having "button," "alternative," and "pointer" fields. In the "button" fields, numerals corresponding to "1," "2," "3," . . . , shown as buttons in FIG. 4, are stored.

The records in the initial table D correspond to the initial groups, respectively. In the "alternative" field of the record, a string is stored of letters representing the corresponding initial group. In the "pointer" field of the record, a pointer to one of the initial-final groups D1–D9 is stored. Note that at the initial-final selecting stage 24b only one of the initial-final groups D1–D9 is referred. In other words, the "pointer" in the record corresponding to the initial group, selected at the initial selecting stage 24a, designates one of the initial-final tables D1–D9.

The initial group is further described bellow. The initials are classified into the first initial group including b and p, the second initial group including m and f, the third initial group including d and t, the forth initial group including n and l, the fifth initial group including g, k and h, the sixth initial group including j, zh and z, the seventh initial group including q, ch and c, the eighth initial group including x, sh, and s, and the ninth initial group including r and the zero initial.

It should be noted that certain syllables with the zero initial are transcribed in accordance with Pinyin as follows. Syllables composed solely of a final in which the first letter is i or v are transcribed into groups of letters in which the first letter is represented as y. And syllables composed solely of a final in which the first letter is u are transcribed into groups of letters in which the first letter is represented as w. Note that according to Pinyin the letter v is equivalent to an umlaut u, and therefore the syllables composed solely of a final in which the first letter is v are represented in this embodiment of the present invention as having yu as the first two letters.

As shown in FIG. 5, in the respective positions where 1, 2, 3, 4, 5, 6, 7, 8, 9, and 0 are displayed in FIG. 4, "bp," "mf," "dt," "nl," "gkh," "jzhz," "qchc," "xshs," "ryw," and "SYM" are displayed. The "bp," "mf," "dt," "nl," "gkh," "jzhz," "qchc," "xshs" and "ryw" buttons correspond to the first through ninth initial groups, respectively. The user selects one of the initial groups with the first touch of a button. Note that for input of a syllable composed solely of a final, the "ryw" button should be pushed.

After the first touch of the button completes the initial selecting stage 24a, the initial-final selecting stage is executed. In the initial-final selecting stage 24b, one of the initial-final tables D1–D9 is referred. FIG. 9 is a schematic diagram showing the initial-final tables D1–D9, each having a plurality of records. Each record in the table has "button," "alternative," and "pointer" fields.

In the "button" fields, numerals corresponding respectively to the buttons "1," "2," "3," . . . , displayed in FIG. 4, are stored. In the "alternative" field, a string is stored of letters corresponding to both an initial and a final group. In the "pointer" field, a pointer to one of the syllable tables D11–D99 is stored. Note that at the final selecting stage 24c only one of the syllable tables D11–D99 is referred. More specifically, the "pointer" in the record, selected at the initial-final selecting stage 24b, designates one of the syllable tables D11–D99.

The initial-final tables D1–D9 are created in accordance with the method of this invention for classifying initials. The method for classifying initials is described bellow. This method is newly developed, based on the statistics and analysis of data on the Chinese language in order to restrict the number of final groups to 10 or less, with the previous method according to the Chinese phonetics being fully adopted.

The finals are classified into simple finals, which are each transcribed into a letter of the alphabet, and complex finals, which are each transcribed into a plurality of letters of the alphabet. The classifying method of this invention further classifies the complex finals into four groups. In other words, with this classifying method, finals are classified into the first final group, composed of the simple finals, and second to fifth final groups, composed of the complex finals.

The second final group is composed of complex finals which are each transcribed into groups of letters in which the first letter is a, e, or o in Pinyin. The third final group is composed of complex finals which are each transcribed into groups of letters in which the first letter is i or y in Pinyin. The fourth final group is composed of complex finals which are each transcribed into groups of letters in which the first letter is u or w in Pinyin. The fifth final group is composed of complex finals which are each transcribed into groups of letters in which the first letter is v or the first letters are yu in Pinyin. According to this embodiment, the first to fifth final groups are symbolized by "?", "*", "i* or y*", "u* or w*", and "v* or yu*", respectively. The alternative symbol representations of the third through fifth groups (y*, w*, and yu*) are used when the respective complex finals have the zero initial. It should be noted that the first letter of a final of the third to fifth final groups in their Pinyin transcription, i (or y), u (or w), and v (or yu), are known under the designation of head vowels. While finals classified into one of the third to fifth final groups include head vowels, those classified into the second final group include no head vowel.

FIG. 10 is a schematic diagram showing views of the second displaying part 12 at the initial-final selecting stage 24b. After a touch of a button displayed in FIG. 5 completes the initial selecting stage 24a, one of screens (D1)–(D9) in FIG. 10 is displayed on the displaying part 12 at the initial-final selecting stage 24b.

More specifically, when the button pushed at the initial selecting stage 24a is "bp" in FIG. 5, the screen (D1) in FIG. 10 is displayed on the displaying part 12. According to the screen (D1) in FIG. 10, in the positions where 1, 2, 3, 4, 5, and 6 are displayed in FIG. 4, "b?," "b*," "bi*," "p?," "p*," and "pi*" are displayed, respectively.

When the button pushed at the initial selecting stage 24a is "mf" in FIG. 5, the screen (D2) in FIG. 10 is displayed on the displaying part 12. According to the screen (D2) in FIG. 10, in the positions where 1, 2, 3, 4, and 5 are displayed in FIG. 4, "m?," "m*," "mi*," "f?," and "f*" are displayed, respectively.

When the button pushed at the initial selecting stage 24a is "dt" in FIG. 5, the screen (D3) in FIG. 10 is displayed on the displaying part 12. According to the screen (D3) in FIG. 10, in the positions where 1, 2, 3, 4, 5, 6, 7, and 8 are displayed in FIG. 4, "d?," "d*," "di*," "du*," "t?," "t*," "ti*," and "tu*" are displayed, respectively.

When the button pushed at the initial selecting stage 24a is "nl" in FIG. 5, the screen (D4) in FIG. 10 is displayed on the displaying part 12. According to the screen (D4) in FIG. 10, in the positions where 1, 2, 3, 4, 5, 6, 7, and 8 are displayed in FIG. 4, "n?," "n*," "ni*," "nu/v*," "l?," "l*," "li*," and "lu/v*" are displayed, respectively.

When the button pushed at the initial selecting stage 24a is "gkh" in FIG. 5, the screen (D5) in FIG. 10 is displayed on the displaying part 12. According to the screen (D5) in FIG. 10, in the positions where 1, 2, 3, 4, 5, 6, 7, 8, and 9 are displayed in FIG. 4, "g?," "g*," "gu*," "k?," "k*," "ku*," "h?," "h*," and "hu*" are displayed, respectively.

When the button pushed at the initial selecting stage 24a is "jzhz" in FIG. 5, the screen (D6) in FIG. 10 is displayed on the displaying part 12. According to the screen (D6) in FIG. 10, in the positions where 1, 2, 3, 4, 5, 6, 7, 8, and 9 are displayed in FIG. 4, "j?," "ji*," "ju*," "zh?," "zh*," "zhu*," "z?," "z*," and "zu*" are displayed, respectively.

When the button pushed at the initial selecting stage 24a is "qchc" in FIG. 5, the screen (D7) in FIG. 10 is displayed on the displaying part 12. According to the screen (D7) in FIG. 10, in the positions where 1, 2, 3, 4, 5, 6, 7, 8, and 9 are displayed in FIG. 4, "q?," "qi*," "qu*," "ch?," "ch*," "chu*," "c?," "c*," and "cu*" are displayed, respectively.

When the button pushed at the initial selecting stage 24a is "xshs" in FIG. 5, the screen (D8) in FIG. 10 is displayed on the displaying part 12. According to the screen (D8) in FIG. 10, in the positions where 1, 2, 3, 4, 5, 6, 7, 8, and 9 are displayed in FIG. 4, "x?," "xi*," "xu*," "sh?," "sh*," "shu*," "s?," "s*," and "su*" are displayed, respectively.

When the button pushed at the initial selecting stage 24a is "ryw" in FIG. 5, the screen (D9) in FIG. 10 is displayed on the displaying part 12. According to the screen (D9) in FIG. 10, in the positions where 1, 2, 3, 4, 5, 6, 7, and 8 are displayed in FIG. 4, "r?," "r*," "ru*," "?," "*," "y*," "w*," and "yu*" are displayed, respectively.

The second touch of a key selects one of the records of the initial-final table (D1–D9). That is, an initial is specified and a final group is selected with the second touch of a key. Note that a record of an initial-final table (D1–D9) being selected corresponds to an initial-final group being specified. After the second touch of a key, the processing proceeds to the final selecting stage 24c, where one of the syllable tables D11–D99 is referred.

FIG. 11 is a schematic diagram showing the syllable tables D11–D99, each having a plurality of records. Each record in the syllable table (D11–D99) has "button," "final," and "syllable" fields.

In the "button" fields, numerals corresponding to the buttons "1," "2," "3," . . . displayed in FIG. 4, are stored, respectively. In the "final" field, a string of letters representing a final is stored. In the "syllable" field, a string of letters representing a syllable, composed of the initial specified at the initial-final selecting stage 24b and the final stored in the "final" field, is stored.

FIGS. 12–20 are schematic views, each showing the second displaying part 12 at the step of selecting a final. After a touch of a button of D1–D9 in FIG. 10 completes the initial-final selecting stage 24b, one of screens in FIGS. 12–20 is displayed on the displaying part 12. The screens in FIGS. 12–20 correspond to the syllable specifying information.

More specifically, when the button pushed at the initial-final selecting stage 24b is "b?" in FIG. 10 (D1), alternatives of syllables, "ba," "bo," "bi," and "bu," are displayed on the displaying part 12 as shown in FIG. 12 (D11).

When the button "b*" in FIG. 10 (D1) is pushed, alternatives of syllables, "bai," "bei," "bao," "ban," "ben," "bang," and "beng," are displayed on the displaying part 12 as shown in FIG. 12 (D12).

When the button "bi*" in FIG. 10 (D1) is pushed, alternatives of syllables, "bie," "biao," "bian," "bin," and "bing," are displayed on the displaying part 12 as shown in FIG. 12 (D13).

When the button "p?" in FIG. 10 (D1) is pushed, alternatives of syllables, "pa," "po," "pi," and "pu," are displayed on the displaying part 12 as shown in FIG. 12 (D14).

When the button "p*" in FIG. 10 (D1) is pushed, alternatives of syllables, "pai," "pei," "pao," "pou," "pan," "pen," "pang," and "peng," are displayed on the displaying part 12 as shown in FIG. 12 (D15).

When the button "pi*" in FIG. 10 (D1) is pushed, alternatives of syllables, "pie," "piao," "pian," "pin," and "ping," are displayed on the displaying part 12 as shown in FIG. 12 (D16).

On the other hand, when the button "m?" in FIG. 10 (D2) is pushed, alternatives of syllables, "ma," "mo," "me," "mi," and "mu," are displayed on the displaying part 12, and a special syllable "m" is also displayed thereon, as shown in FIG. 13 (D21).

When the button "m*" in FIG. 10 (D2) is pushed, alternatives of syllables, "mai," "mei," "mao," "mou," "man," "men," "mang," and "meng," are displayed on the displaying part 12 as shown in FIG. 13 (D22).

When the button "mi*" in FIG. 10 (D2) is pushed, alternatives of syllables, "mie," "miao," "miu," "mian," "min," and "ming," are displayed on the displaying part 12 as shown in FIG. 13 (D23).

When the button "f?" in FIG. 10 (D2) is pushed, alternatives of syllables, "fa," "fo," and "fu," are displayed on the displaying part 12 as shown in FIG. 13 (D24).

When the button "f*" in FIG. 10 (D2) is pushed, alternatives of syllables, "fei," "fou," "fan," "fen," "fang," and "feng," are displayed on the displaying part 12 as shown in FIG. 13 (D25).

On the other hand, when the button "d?" in FIG. 10 (D3) is pushed, alternatives of syllables, "da," "de," "di," and "du," are displayed on the displaying part 12 as shown in FIG. 14 (D31).

When the button "d*" in FIG. 10 (D3) is pushed, alternatives of syllables, "dai," "dei," "dao," "dou," "dan," "dang," "deng," and "dong," are displayed on the displaying part 12 as shown in FIG. 14 (D32).

When the button "di*" in FIG. 10 (D3) is pushed, alternatives of syllables, "dia," "die," "diao," "diu," "dian," and "ding," are displayed on the displaying part 12 as shown in FIG. 14 (D33).

When the button "du*" in FIG. 10 (D3) is pushed, alternatives of syllables, "duo," "dui," "duan," and "dun," are displayed on the displaying part 12 as shown in FIG. 14 (D34). Note that in FIG. 14 (D34) parenthesized "dong" is displayed. The parenthesized "dong" is unnecessary, if only Pinyin is adopted. However, instead of the parenthesized "dong," "dong" without parenthesis should be displayed, if Bopomofo is adopted.

When the button "t?" in FIG. 10 (D3) is pushed, alternatives of syllables, "ta," "te," "ti," and "tu," are displayed on the displaying part 12 as shown in FIG. 14 (D35).

When the button "t*" in FIG. 10 (D3) is pushed, alternatives of syllables, "tai," "tei," "tao," "tou," "tan," "tang," "teng," and "tong," are displayed on the displaying part 12 as shown in FIG. 14 (D36).

When the button "ti*" in FIG. 10 (D3) is pushed, alternatives of syllables, "tie," "tiao," "tian," and "ting," are displayed on the displaying part 12 as shown in FIG. 14 (D37).

When the button "tu*" in FIG. 10 (D3) is pushed, alternatives of syllables, "tuo," "tui," "tuan," and "tun," are displayed on the displaying part 12 as shown in FIG. 14 (D38). Note that in FIG. 14 (D38) parenthesized "tong" is displayed. The parenthesized "tong" is unnecessary, if only Pinyin is adopted. However, instead of the parenthesized "tong," "tong" without parenthesis should be displayed, if Bopomofo is adopted.

On the other hand, when the button "n?" in FIG. 10 (D4) is pushed, alternatives of syllables, "na," "ne," "ni," "nu," and "nv," are displayed on the displaying part 12, and a special syllable "n" is also displayed thereon, as shown in FIG. 15 (D41).

When the button "n*" in FIG. 10 (D4) is pushed, alternatives of syllables, "nai," "nei," "nao," "nou," "nan," "nen," "nang," "neng," and "nong," are displayed on the displaying part 12 as shown in FIG. 15 (D42).

When the button "ni*" in FIG. 10 (D4) is pushed, alternatives of syllables, "nie," "niao," "niu," "nian," "nin," "niang," and "ning," are displayed on the displaying part 12 as shown in FIG. 15 (D43).

When the button "nu/v*," equivalent to nu*/nv*, in FIG. 10 (D4) is pushed, alternatives of syllables, "nuo," "nve," and "nuan," are displayed on the displaying part 12 as shown in FIG. 15 (D44). Note that in FIG. 15 (D44) parenthesized "nong" is displayed. The parenthesized "nong" is unnecessary, if only Pinyin is adopted. However, instead of the parenthesized "nong," "nong" without parenthesis should be displayed, if Bopomofo is adopted.

When the button "l?" in FIG. 10 (D4) is pushed, alternatives of syllables, "la," "1o," "le," "li," "lu," and "lv," are displayed on the displaying part 12 as shown in FIG. 15 (D45).

When the button "l*" in FIG. 10 (D4) is pushed, alternatives of syllables, "lai," "lei," "lao," "lou," "lan," "lang," "leng," and "long," are displayed on the displaying part 12 as shown in FIG. 15 (D46).

When the button "li*" in FIG. 10 (D4) is pushed, alternatives of syllables, "lia," "lie," "liao," "liu," "lian," "lin," "liang," and "ling," are displayed on the displaying part 12 as shown in FIG. 15 (D47).

When the button "lu/v*," equivalent to lu*/lv*, in FIG. 10 (D4) is pushed, alternatives of syllables, "luo," "lve," "luan," and "lun," are displayed on the displaying part 12 as shown in FIG. 15 (D48). Note that in FIG. 15 (D48) parenthesized "long" is displayed. The parenthesized "long" is unnecessary, if only Pinyin is adopted. However, instead of the parenthesized "long," "long" without parenthesis should be displayed, if Bopomofo is adopted.

On the other hand, when the button "g?" in FIG. 10 (D5) is pushed, alternatives of syllables, "ga," "ge," and "gu," are displayed on the displaying part 12 as shown in FIG. 16 (D51).

When the button "g*" in FIG. 10 (D5) is pushed, alternatives of syllables, "gai," "gei," "gao," "gou," "gan," "gen," "gang," "geng," and "gong," are displayed on the displaying part 12 as shown in FIG. 16 (D52).

When the button "gu*" in FIG. 10 (D5) is pushed, alternatives of syllables, "gua," "guo," "guai," "gui," "guan," "gun," and "guang," are displayed on the displaying part 12 as shown in FIG. 16 (D53). Note that in FIG. 16 (D53) parenthesized "gong" is displayed. The parenthesized "gong" is unnecessary, if only Pinyin is adopted. However, instead of the parenthesized "gong," "gong" without parenthesis should be displayed, if Bopomofo is adopted.

When the button "k?" in FIG. 10 (D5) is pushed, alternatives of syllables, "ka," "ke," and "ku," are displayed on the displaying part 12 as shown in FIG. 16 (D54).

When the button "k*" in FIG. 10 (D5) is pushed, alternatives of syllables, "kai," "kei," "kao," "kou," "kan," "ken," "kang," "keng," and "kong," are displayed on the displaying part 12 as shown in FIG. 16 (D55).

When the button "ku*" in FIG. 10 (D5) is pushed, alternatives of syllables, "kua," "kuo," "kuai," "kui," "kuan," "kun," and "kuang," are displayed on the displaying part 12 as shown in FIG. 16 (D56). Note that in FIG. 16 (D56) parenthesized "kong" is displayed. The parenthesized "kong" is unnecessary, if only Pinyin is adopted. However, instead of the parenthesized "kong," "kong" without parenthesis should be displayed, if Bopomofo is adopted.

When the button "h?" in FIG. 10 (D5) is pushed, alternatives of syllables, "ha," "he," and "hu," are displayed on the displaying part 12 as shown in FIG. 16 (D57).

When the button "h*" in FIG. 10 (D5) is pushed, alternatives of syllables, "hai," "hei," "hao," "hou," "han," "hen," "hang," "heng," and "hong," are displayed on the displaying part 12, and a special syllable "hng" is also displayed thereon, as shown in FIG. 16 (D58).

When the button "hu*" in FIG. 10 (D5) is pushed, alternatives of syllables, "hua," "huo," "huai," "hui," "huan," "hun," and "huang," are displayed on the displaying part 12 as shown in FIG. 16 (D59). Note that in FIG. 16 (D59) parenthesized "hong" is displayed. The parenthesized "hong" is unnecessary, if only Pinyin is adopted. However, instead of the parenthesized "hong," "hong" without parenthesis should be displayed, if Bopomofo is adopted.

On the other hand, when the button "j?" in FIG. 10 (D6) is pushed, alternatives of syllables, "ji," and "ju," are displayed on the displaying part 12 as shown in FIG. 17 (D61). Note that in FIG. 17 (D61) parenthesized "ju" is displayed. The parenthesized "ju" is unnecessary, if only Pinyin is adopted. However, instead of the parenthesized "ju," "ju" without parenthesis should be displayed, if Bopomofo is adopted.

When the button "ji*" in FIG. 10 (D6) is pushed, alternatives of syllables, "jia," "jie," "jiao," "jiu," "jian," "jin," "jiang," "jing," and "jiong," are displayed on the displaying part 12 as shown in FIG. 17 (D62).

When the button "ju*" in FIG. 10 (D6) is pushed, alternatives of syllables, "jue," "juan," and "jun," are displayed on the displaying part 12 as shown in FIG. 17 (D63). Note that in FIG. 17 (D63) parenthesized "jiong" is displayed. The parenthesized "jiong" is unnecessary, if only Pinyin is adopted. However, instead of the parenthesized "jiong," "jiong" without parenthesis should be displayed, if Bopomofo is adopted.

When the button "zh?" in FIG. 10 (D6) is pushed, alternatives of syllables, "zha," "zhe," "zhi," and "zhu," are displayed on the displaying part 12 as shown in FIG. 17 (D64). Note that in FIG. 17 (D64) parenthesized "zhi" is displayed. The parenthesized "zhi" is unnecessary, if only Pinyin is adopted. However, instead of the parenthesized "zhi," "zhi" without parenthesis should be displayed, if Bopomofo is adopted.

When the button "zh*" in FIG. 10 (D6) is pushed, alternatives of syllables, "zhai," "zhei," "zhao," "zhou," "zhan," "zhen," "zhang," "zheng," and "zhong," are displayed on the displaying part 12 as shown in FIG. 17 (D65).

When the button "zhu*" in FIG. 10 (D6) is pushed, alternatives of syllables, "zhua," "zhuo," "zhuai," "zhui," "zhuan," "zhun," and "zhuang," are displayed on the displaying part 12 as shown in FIG. 17 (D66). Note that in FIG. 17 (D66) parenthesized "zhong" is displayed. The parenthesized "zhong" is unnecessary, if only Pinyin is adopted. However, instead of the parenthesized "zhong," "zhong" without parenthesis should be displayed, if Bopomofo is adopted.

When the button "z?" in FIG. 10 (D6) is pushed, alternatives of syllables, "za," "ze," "zi," and "zu," are displayed on the displaying part 12 as shown in FIG. 17 (D67). Note that in FIG. 17 (D67) parenthesized "zi" is displayed. The parenthesized "zi" is unnecessary, if only Pinyin is adopted. However, instead of the parenthesized "zi," "zi" without parenthesis should be displayed, if Bopomofo is adopted.

When the button "z*" in FIG. 10 (D6) is pushed, alternatives of syllables, "zai," "zei," "zao," "zou," "zan," "zen," "zang," "zeng," and "zong," are displayed on the displaying part 12 as shown in FIG. 17 (D68).

When the button "zu*" in FIG. 10 (D6) is pushed, alternatives of syllables, "zuo," "zui," "zuan," and "zun," are displayed on the displaying part 12 as shown in FIG. 17 (D69). Note that in FIG. 17 (D69) parenthesized "zong" is displayed. The parenthesized "zong" is unnecessary, if only Pinyin is adopted. However, instead of the parenthesized "zong," "zong" without parenthesis should be displayed, if Bopomofo is adopted.

On the other hand, when the button "q?" in FIG. 10 (D7) is pushed, alternatives of syllables, "qi," and "qu," are displayed on the displaying part 12 as shown in FIG. 18 (D71). Note that in FIG. 18 (D71) parenthesized "qu" is displayed. The parenthesized "qu" is unnecessary, if only Pinyin is adopted. However, instead of the parenthesized "qu," "qu" without parenthesis should be displayed, if Bopomofo is adopted.

When the button "qi*" in FIG. 10 (D7) is pushed, alternatives of syllables, "qia," "qie," "qiao," "qiu," "qian," "qin," "qiang," "qing," and "qiong," are displayed on the displaying part 12 as shown in FIG. 18 (D72).

When the button "qu*" in FIG. 10 (D7) is pushed, alternatives of syllables, "que," "quan," and "qun," are displayed on the displaying part 12 as shown in FIG. 18 (D73). Note that in FIG. 18 (D73) parenthesized "qiong" is displayed. The parenthesized "qiong" is unnecessary, if only Pinyin is adopted. However, instead of the parenthesized "qiong," "qiong" without parenthesis should be displayed, if Bopomofo is adopted.

When the button "ch?" in FIG. 10 (D7) is pushed, alternatives of syllables, "cha," "che," "chi," and "chu," are displayed on the displaying part 12 as shown in FIG. 18 (D74). Note that in FIG. 18 (D74) parenthesized "chi" is displayed. The parenthesized "chi" is unnecessary, if only Pinyin is adopted. However, instead of the parenthesized "chi," "chi" without parenthesis should be displayed, if Bopomofo is adopted.

When the button "ch*" in FIG. 10 (D7) is pushed, alternatives of syllables, "chai," "chao," "chou," "chan," "chen," "chang," "cheng," and "chong," are displayed on the displaying part 12 as shown in FIG. 18 (D75).

When the button "chu*" in FIG. 10 (D7) is pushed, alternatives of syllables, "chuo," "chuai," "chui," "chuan," "chun," and "chuang," are displayed on the displaying part 12 as shown in FIG. 18 (D76). Note that in FIG. 18 (D76) parenthesized "chong" is displayed. The parenthesized "chong" is unnecessary, if only Pinyin is adopted. However, instead of the parenthesized "chong," "chong" without parenthesis should be displayed, if Bopomofo is adopted.

When the button "c?" in FIG. 10 (D7) is pushed, alternatives of syllables, "ca," "ce," "ci," and "cu," are displayed on the displaying part 12 as shown in FIG. 18 (D77). Note that in FIG. 18 (D77) parenthesized "ci" is displayed. The parenthesized "ci" is unnecessary, if only Pinyin is adopted. However, instead of the parenthesized "ci," "ci" without parenthesis should be displayed, if Bopomofo is adopted.

When the button "c*" in FIG. 10 (D7) is pushed, alternatives of syllables, "Cai," "cao," "cou," "can," "cen," "cang," "ceng," and "cong," are displayed on the displaying part 12 as shown in FIG. 18 (D78).

When the button "cu*" in FIG. 10 (D7) is pushed, alternatives of syllables, "cuo," "cui," "cuan," and "cun," are displayed on the displaying part 12 as shown in FIG. 18 (D79). Note that in FIG. 18 (D79) parenthesized "Gong" is displayed. The parenthesized "cong" is unnecessary, if only Pinyin is adopted. However, instead of the parenthesized "Gong," "Gong" without parenthesis should be displayed, if Bopomofo is adopted.

On the other hand, when the button "x?" in FIG. 10 (D8) is pushed, alternatives of syllables, "xi," and "xu," are displayed on the displaying part 12 as shown in FIG. 19 (D81). Note that in FIG. 19 (D81) parenthesized "xu" is displayed. The parenthesized "xu" is unnecessary, if only Pinyin is adopted. However, instead of the parenthesized "xu," "xu" without parenthesis should be displayed, if Bopomofo is adopted.

When the button "xi*" in FIG. 10 (D8) is pushed, alternatives of syllables, "xia," "xie," "xiao," "xiu," "xian," "xin," "xiang," "xing," and "xiong," are displayed on the displaying part 12 as shown in FIG. 19 (D82).

When the button "xu*" in FIG. 10 (D8) is pushed, alternatives of syllables, "xue," "xuan," and "xun," are displayed on the displaying part 12 as shown in FIG. 19 (D83). Note that in FIG. 19 (D83) parenthesized "xiong" is displayed. The parenthesized "xiong" is unnecessary, if only Pinyin is adopted. However, instead of the parenthesized "xiong," "xiong" without parenthesis should be displayed, if Bopomofo is adopted.

When the button "sh?" in FIG. 10 (D8) is pushed, alternatives of syllables, "sha," "she," "shi," and "shu," are displayed on the displaying part 12 as shown in FIG. 19 (D84). Note that in FIG. 19 (D84) parenthesized "shi" is displayed. The parenthesized "shi" is unnecessary, if only Pinyin is adopted. However, instead of the parenthesized "shi," "shi" without parenthesis should be displayed, if Bopomofo is adopted.

When the button "sh*" in FIG. 10 (D8) is pushed, alternatives of syllables, "shai," "shei," "shao," "shou," "shan," "shen," "shang," and "sheng," are displayed on the displaying part 12 as shown in FIG. 19 (D85).

When the button "shu*" in FIG. 10 (D8) is pushed, alternatives of syllables, "shua," "shuo," "shuai," "shui," "shuan," "shun," and "shuang," are displayed on the displaying part 12 as shown in FIG. 19 (D86).

When the button "s?" in FIG. 10 (D8) is pushed, alternatives of syllables, "sa," "se," "si," and "su," are displayed on the displaying part 12 as shown in FIG. 19 (D87). Note that in FIG. 19 (D87) parenthesized "si" is displayed. The parenthesized "si" is unnecessary, if only Pinyin is adopted. However, instead of the parenthesized "si," "si" without parenthesis should be displayed, if Bopomofo is adopted.

When the button "s*" in FIG. 10 (D8) is pushed, alternatives of syllables, "sai," "sao," "sou," "san," "sen," "sang," "seng," and "song," are displayed on the displaying part 12 as shown in FIG. 19 (D88).

When the button "su*" in FIG. 10 (D8) is pushed, alternatives of syllables, "suo," "sui," "suan," and "sun," are displayed on the displaying part 12 as shown in FIG. 19 (D89). Note that in FIG. 19 (D89) parenthesized "song" is displayed. The parenthesized "song" is unnecessary, if only Pinyin is adopted. However, instead of the parenthesized "song," "song" without parenthesis should be displayed, if Bopomofo is adopted.

On the other hand, when the button "r?" in FIG. 10 (D9) is pushed, alternatives of syllables, "re," "ri," and "ru," are displayed on the displaying part 12 as shown in FIG. 20 (D91). Note that in FIG. 20 (D91) parenthesized "ri" is displayed. The parenthesized "ri" is unnecessary, if only Pinyin is adopted. However, instead of the parenthesized "ri," "ri" without parenthesis should be displayed, if Bopomofo is adopted.

When the button "r*" in FIG. 10 (D9) is pushed, alternatives of syllables, "rao," "rou," "ran," "ren," "rang," "reng," and "rong," are displayed on the displaying part 12 as shown in FIG. 20 (D92).

When the button "ru*" in FIG. 10 (D9) is pushed, alternatives of syllables, "ruo," "rui," "ruan," and "run," are displayed on the displaying part 12 as shown in FIG. 20 (D93). Note that in FIG. 20 (D93) parenthesized "rong" is displayed. The parenthesized "rong" is unnecessary, if only Pinyin is adopted. However, instead of the parenthesized "rong," "rong" without parenthesis should be displayed, if Bopomofo is adopted.

When the button "?" in FIG. 10 (D9) is pushed, alternatives of syllables, "a," "o," "e," "yi," "wu," "yu," "^e," and "er," are displayed on the displaying part 12 as shown in FIG. 20 (D94).

When the button "*" in FIG. 10 (D9) is pushed, alternatives of syllables, "ai," "ei," "ao," "ou," "an," "en," "ang," "eng," and "ong," are displayed on the displaying part 12, and a special syllable "ng" is also displayed thereon, as shown in FIG. 20 (D95).

When the button "y*" in FIG. 10 (D9) is pushed, alternatives of syllables, "ya," "ye," "yao," "you," "yan," "yin," "yang," "ying," and "yong," are displayed on the displaying part 12, and a special syllable "yo" is also displayed thereon, as shown in FIG. 20 (D96).

When the button "w*" in FIG. 10 (D9) is pushed, alternatives of syllables, "wa," "wo," "wai," "wei," "wan,"

"wen," "wang," and "weng," are displayed on the displaying part 12 as shown in FIG. 20 (D97).

When the button "yu*" in FIG. 10 (D9) is pushed, alternatives of syllables, "yue," "yuan," and "yun," are displayed on the displaying part 12 as shown in FIG. 20 (D98). Note that in FIG. 20 (D98) parenthesized "yong" is displayed. The parenthesized "yong" is unnecessary, if only Pinyin is adopted. However, instead of the parenthesized "yong," "yong" without parenthesis should be displayed, if Bopomofo is adopted.

As described above, an initial group is specified at the initial selecting stage 24a, an initial is determined and a final group is also specified at the initial-final selecting stage 24b, and a syllable is determined at the final selecting stage 24c. Note that elements each stored in the "syllable" field in the syllable tables D11–D99 in FIG. 11, are displayed in FIGS. 12–20. Instead of that, elements each stored in the "final" field may be displayed.

Besides the standard syllables shown in FIG. 6, the special syllables are included in FIGS. 12–20. FIG. 21 is a schematic diagram showing procedures for inputting the special syllables. As shown in FIG. 21, the special syllable "m" is input by "mf" in FIG. 5 being selected at the initial selecting stage, "m?" in FIG. 10 (D2) being selected at the initial-final selecting stage, and "m" in FIG. 13 (D21) being selected. Note that the place where "m" is displayed in FIG. 13 (D21) corresponds to that where "0" is displayed in FIG. 4. More specifically, the place where "0" is displayed in FIG. 4 has connotations of exceptions, and used for input of the special syllables.

The special syllable "n" is input by "nl" in FIG. 5 being selected at the initial selecting stage, "n?" in FIG. 10 (D4) being selected at the initial-final selecting stage, and "n" in FIG. 15 (D41) being selected at the final selecting stage.

The special syllable "hng" is input by "gkh" in FIG. 5 being selected at the initial selecting stage, "h*" in FIG. 10 (D5) being selected at the initial-final selecting stage, and "hng" in FIG. 16 (D58) being selected at the final selecting stage.

The special syllable "ng" is input by "ryw" in FIG. 5 being selected at the initial selecting stage, "*" in FIG. 10 (D9) being selected at the initial-final selecting stage, and "ng" in FIG. 20 (D95) being selected at the final selecting stage.

The special syllable "yo" is input by "ryw" in FIG. 5 being selected at the initial selecting stage, "y*" in FIG. 10 (D9) being selected at the initial-final selecting stage, and "yo" in FIG. 20 (D96) being selected at the final selecting stage.

Figure 22:
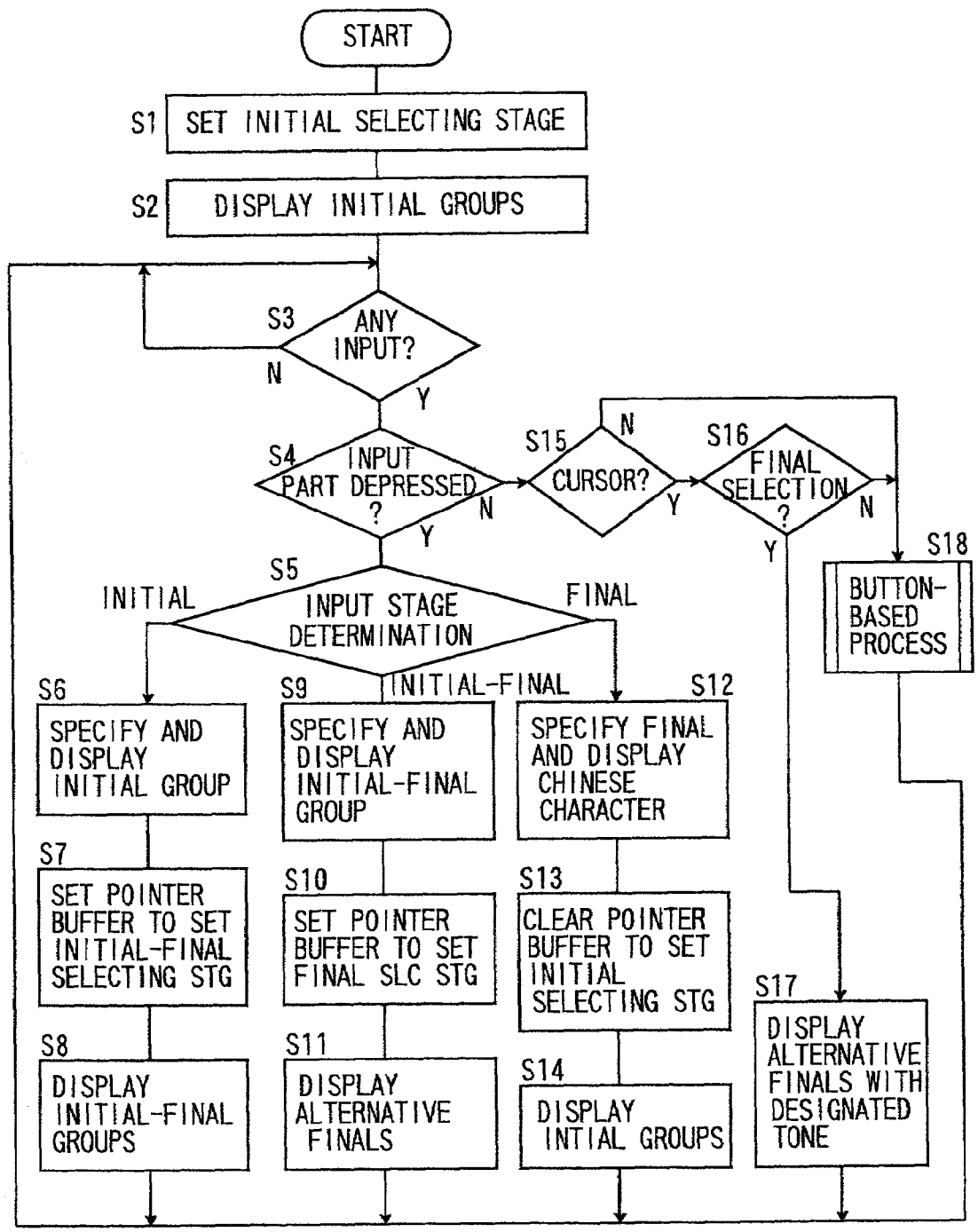
FIG. 22 is a flowchart showing the processing according to the first embodiment of the present invention.

With reference to the flowchart in FIG. 22, the process of the input module 24 of the Chinese language input program 23, is further described as follows. The flowchart is initiated when the user pushes the mode button 15 to set the Chinese input mode, and terminated when the user sets another input mode.

It should be noted that the controller 20 refers to the pointer buffer 22 to recognize the present stage, which is the initial selecting stage, the initial-final selecting stage, or the final selecting stage. More specifically, the stage is the initial selecting stage when the pointer buffer 22 is NULL. The stage is the initial-final selecting stage when one of D1–D9 is stored in the pointer buffer 22. The stage is the final selecting stage when one of D11–D99 is stored in the pointer buffer 22.

At step S1 the controller 20 clear the pointer buffer 22 NULL to set the initial selecting stage.

At step S2 the controller 20 refers to the initial table D in FIG. 8 to display the alternatives of initial groups on the displaying part 12. The screen shown in FIG. 5 is displayed thereon.

At step S3 the controller 20 monitors input by the user. When input is detected, the processing advances to step S4.

At step S4 the controller 20 distinguishes whether the input by the user was the input part 13 being pushed or another types of input. Note that another types of input includes input by operation of the cursor 14, a back space key, or keys used for the conversion module 25. When it is distinguished that the input part 13 was pushed, the processing advances to step S5. In other cases, the processing advances to step S15.

At step S5 the controller 20 refers to the pointer buffer 22 to distinguish which the present stage is the initial selecting stage, the initial-final selecting stage, or the final selecting stage. When the step is the initial selecting stage, the processing advances to S6. When the stage is the initial-final selecting stage, the processing advances to S9. When the stage is the final selecting stage, the processing advances to step S12.

At step S6 the controller 20 specifies which one of the buttons shown in FIG. 5 is touched, based on the place on the input part 13 touched by the user. That is, the controller 20 specifies which one of the records in the initial table D in FIG. 8 is selected by the user. Then the controller 20 displays the initial group stored in the "alternative" field in the specified record on the first displaying part 11. For example, when the record whose "alternative" is "bp" is specified, "bp" is displayed on the displaying part 11.

At step S7 the controller 20 writes to the pointer buffer 22 to set the input stage as the initial-final selecting stage. More specifically, the controller 20 obtains the value stored in the "pointer" field in the record specified at S6, and writes the obtained value to the pointer buffer 22. For example, when the record whose "alternative" is "bp" is specified, "D1" is stored in the pointer buffer 22.

At step S8 the controller 20 refers one of the initial-final tables D1–D9 in FIG. 9 corresponding to the value stored in the pointer buffer 22 to display alternatives of the initial-final groups on the second displaying part 12. One of the screens (D1)–(D9) in FIG. 10 is displayed on the displaying part 12. For example, when "D1" is stored in the pointer buffer 22, the screen (D1) in FIG. 10 is displayed. The processing returns to S3.

At step S9, because the stage has been specified as the initial-final selecting stage, the controller 20 specifies which one of the buttons displayed in FIG. 10 is touched based on the place on the input part 13 touched by the user. That is, the controller 20 specifies which one of the records in the initial-final tables D1–D9 is selected by the user. Then, the controller 20 displays the initial-final group stored in the "alternative" field of the specified record on the first displaying part 11, instead of the initial group displayed thereon. For example, the record whose "alternative" is "b?" is specified, the initial-final group "b?" is displayed on the displaying part 11, instead of the initial group "bp" displayed thereon At step S10 the controller 20 writes to the pointer buffer 22 to set the input stage as the final selecting stage. More specifically, the controller 20 obtains the value stored in the "pointer" field in the record specified at S9 from the records in the initial-final tables D1–D9 in FIG. 9, and writes the obtained value to the pointer buffer 22. For example, when the record whose "alternative" is "b?" is specified, "D11" is stored in the pointer buffer 22.

At step S11 the controller 20 refers one of the syllable tables D11–D99 in FIG. 11 corresponding to the value stored in the pointer buffer 22 to display alternatives of the syllables on the second displaying part 12. One of the screens (D11)–(D99) in FIGS. 12–20 is displayed on the displaying part 12. For example, when "D11" is stored in the pointer buffer 22, the screen (D11) in FIG. 12 is displayed. The processing returns to S3.

At step S12, because the stage has been specified as the final selecting stage, the controller 20 specifies which one of the buttons displayed in FIGS. 12–20 is touched based on the place on the input part 13 touched by the user. That is, the controller 20 specifies which one of the records in the syllable tables D11–D99 in FIG. 11 is selected by the user. The "syllable" of the specified record is determined as the syllable input by the user.

Further, the controller 20 transmits the determined syllable to the conversion module 25, and obtains a Chinese character corresponding to the determined syllable from the conversion module 25. Note that when a plurality of characters for alternatives exists, the character registered as the first alternative, for example, is obtained. It should be also noted that the conversion module 25 may take into account of the syllable previously input to select a Chinese character. Then the controller 20 displays the Chinese character obtained from the conversion module 25 on the first displaying part 11, instead of the initial-final group displayed thereon.

At step S13 the controller 20 clear the pointer buffer 22 to set the input stage as the initial selecting stage. In other words, the pointer buffer 22 is set to be NULL for the next input of a syllable.

At step S14 the controller 20 refers the initial table D in FIG. 8 to display the alternatives of the initial groups on the second displaying part 12. On the displaying part 12 the screen shown in FIG. 5 is displayed. The processing returns to S3.

On the other hand, at step S15, because input made at S4 was not via input part 13, the controller 20 judges whether the input was made via cursor 14 or not. The processing advances to S16 in the case that the input was done via cursor 14, or alternatively advances to S18 in all other cases.

At step S16 the controller 20 judges whether the input stage is the final selecting stage or not. Note that when one of D11–D99 is stored in the pointer buffer 22, the input stage is final selecting stage. The processing advances to S17 in the case that the stage is the final selecting stage, or alternatively advances to S18 in all other cases.

At step S17 the controller 20 judges the tone based on the input via cursor 14 by the user, and displays a screen including denotation of the tone. The processing returns to S3. More specifically, the controller 20 judges that the first tone has been designated if the upward direction of the cursor 14 was input, the second tone has been designated if the right direction of the cursor 14 was input, the third tone has been designated if the downward direction of the cursor 14 was input, or the fourth tone has been designated if the left direction of the cursor 14 was input. Then the controller 20 assigns "1" if the first tone is designated, assigns "2" if the second tone is designated, assigns "3" if the third tone is designated, or assigns "4" if the fourth tone is designated, to display the screen including both the "syllable" of the syllable tables D11–D99 in FIG. 11 and one of "1"–"4" assigned corresponding to the tone which should follow to said "syllable," on the second displaying part 12.

Figure 23:
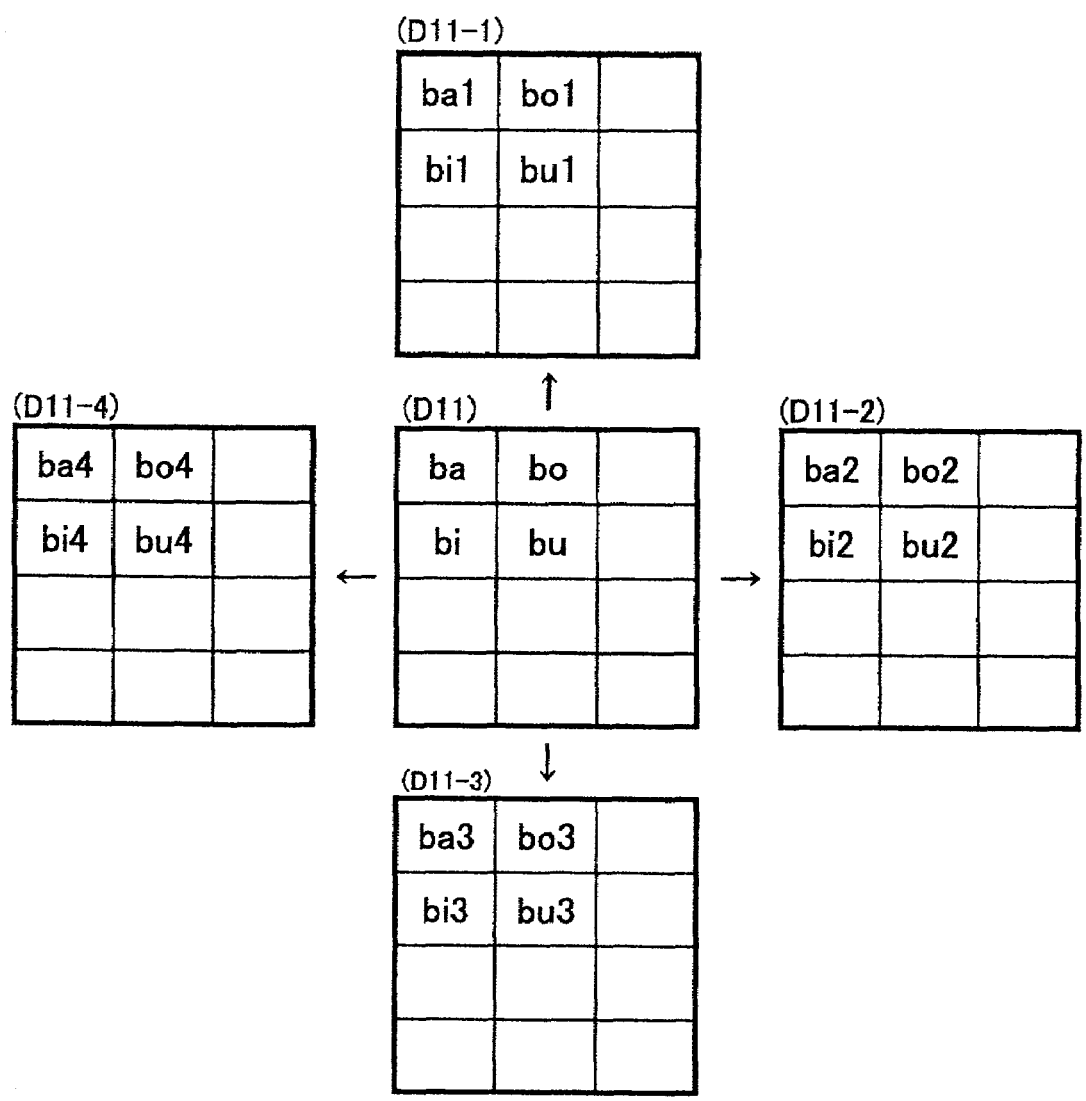
FIG. 23 is a schematic diagram illustrating selection of a tone.

For example, with D11 in the pointer buffer 22, if the first tone is selected, FIG. 23 (D11-1) is displayed, if the second tone is selected, FIG. 23 (D11-2) is displayed, if the third tone is selected, FIG. 23 (D11-3) is displayed, if the fourth tone is selected, FIG. 23 (D11-4) is displayed.

It should be noted that according to the description on S12, what is transmitted to the conversion module 25 is a "syllable." However, if the user designates the tone, what is transmitted to the conversion module 25 is a "syllable with a tone." In this case, the conversion module 25 selects a Chinese character taking the tone into account.

At step S18 the controller 20 executes a process corresponding to the operation by the user. For example, if the key used by the conversion module 25 was operated, the controller 20 executes the processing such as selecting or specifying a Chinese character, according to the function assigned to the key. Then the processing returns to S3.

As described above, according to the embodiment, each syllable is specified by three touches of keys. If the cursor 14 is operated after two touches of keys to the input part 13, i.e., the input part 13 or the cursor 14 are operated in four times in all, a syllable with a tone is specified.

Figure 24:
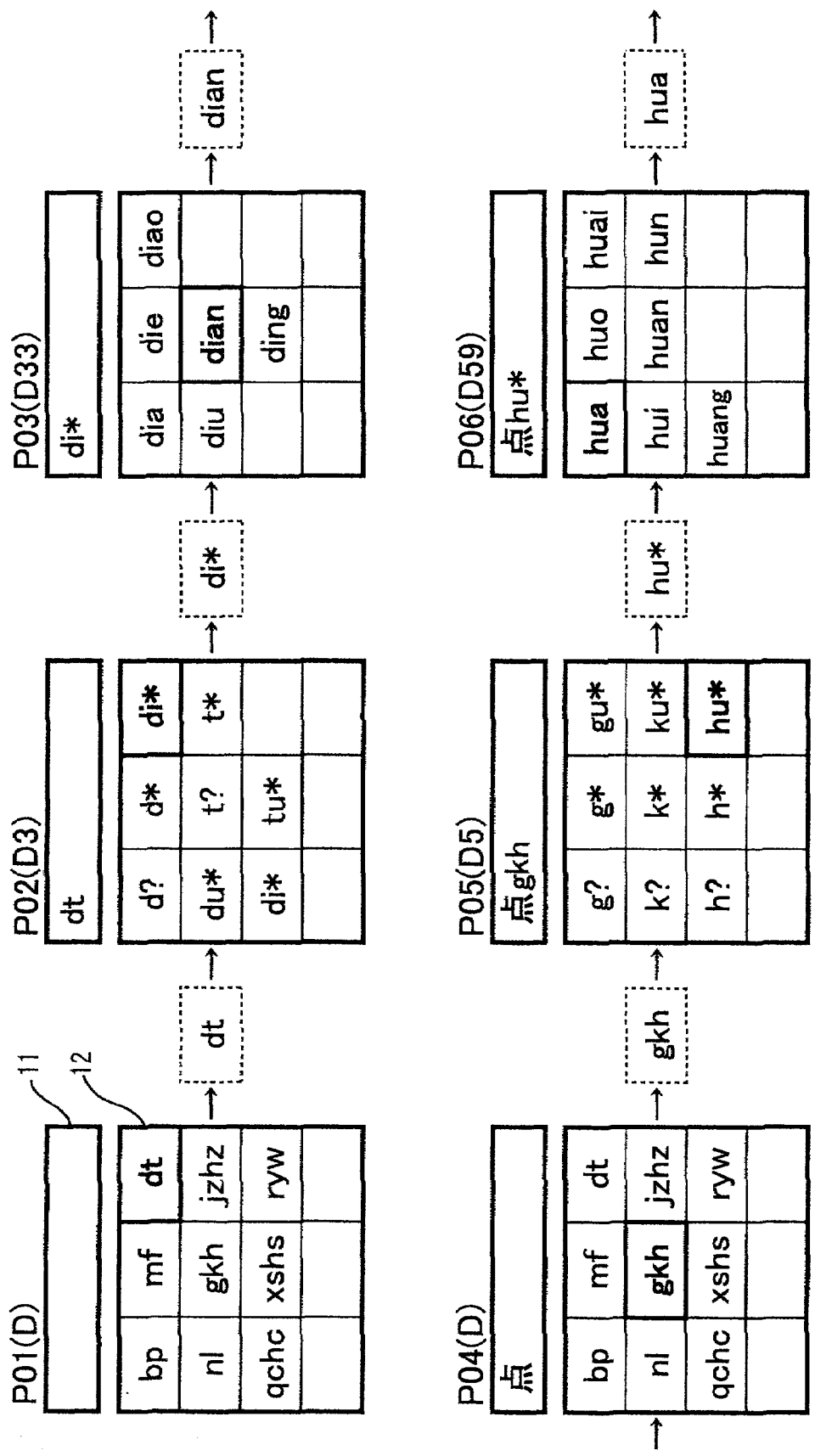
FIG. 24 is a diagram showing an example of input of the Chinese characters according to the first embodiment of the present invention.
Figure 25:
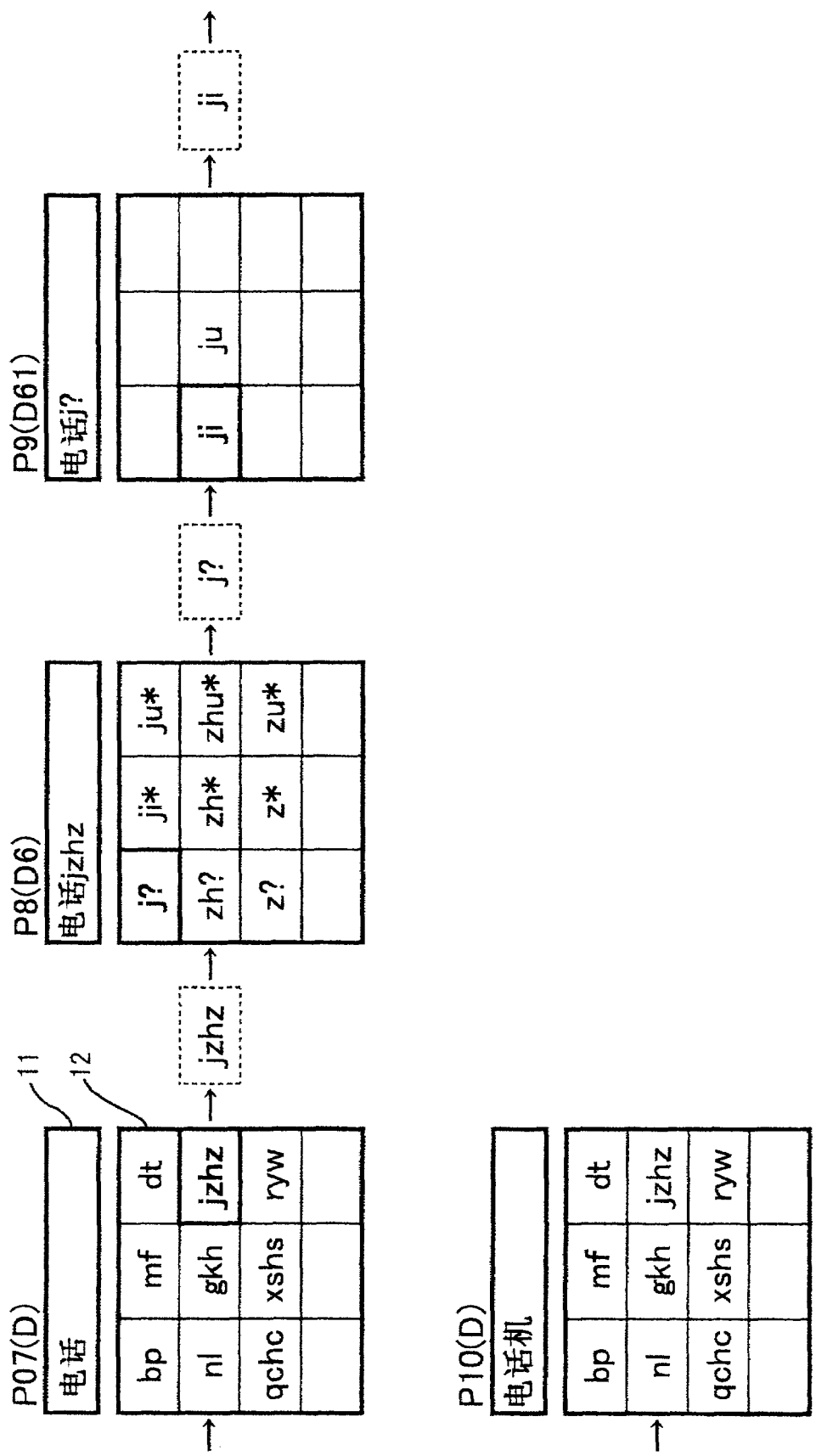
FIG. 25 is a diagram showing the example of input of the Chinese characters according to the first embodiment of the present invention.

More specific description of input is described bellow with reference to the FIGS. 24 and 25. The example of the input is on "dianhuaji" in Pinyin corresponding to the string of Chinese characters which means a telephone set. Each of the display examples P01–P10 in FIGS. 24 and 25 schematically shows both the displaying parts 11 and 12.

The screen displayed first is shown in P01 in FIG. 24, according to which the alternatives of initial groups in the initial table D are displayed on the second displaying part 12. Note that nothing is displayed on the first displaying part 11. When the user pushes the button of "dt" to select the initial group "dt," the displaying parts 11 and 12 are switched to the state shown as P02.

In the state P02, "dt" is displayed on the first displaying part 11, and the alternatives of the initial-final groups in the initial-final table D3 are displayed on the second displaying part 12. When the user pushes the button of "di*" to select the initial-final gourp "di*," the displaying parts 11 and 12 are switched to the state shown as P3.

In the state P3, "di*" is displayed on the first displaying part 11, and the alternatives of the syllables in the syllable table D33 are displayed on the second displaying part 12. When the user pushes the button of "dian" to select the syllable "dian," the displaying parts 11 and 12 are switched to the state shown as P04.

In the state P04, the Chinese character corresponding to the syllable "dian" is displayed on the first displaying part 11. On the second displaying part 12, the alternatives of initial groups in the initial table D are displayed for the next input of a syllable. When the user pushes the button of "gkh" to select the initial group "gkh," the displaying parts 11 and 12 are switched to the state shown as P05.

In the state P05, both the Chinese character corresponding to the input syllable and the initial group "gkh" newly selected are displayed on the first displaying part 11. On the second displaying part 12, the alternatives are displayed of the initial-final groups in the initial-final table D5. When the user pushes the button of "hu*" to select the initial-final group "hu*," the displaying parts 11 and 12 are switched to the state shown as P6.

In the state P6, both the Chinese character corresponding to the input syllable and the initial-final group "hu*" newly selected are displayed on the first displaying part 11. On the second displaying part 12, the alternatives are displayed of syllables in the syllable table D59. When the user pushes the button of "hua" to select the syllable "hua," the displaying part 11 and 12 are switched to the state shown as P07 in FIG. 25.

In the state P07, the string of Chinese characters that means telephone is displayed on the first displaying part 11, because the conversion module 25 executed conversion again. The conversion was made based on both the syllable "dian" previously input and the syllable "hua" input after "dian," because the syllable "hua" was specified after the Chinese character corresponding to dian was displayed in the state P06. That is, the Chinese characters corresponding to "dianhua" are displayed on the first displaying part 11. On the second displaying part 12, the alternatives are displayed of initial groups in the initial table D. When the user pushes the button of "jzhz" to select the initial group "jzhz," the displaying parts 11 and 12 are switched to the state shown as P08.

In the state P08, both the Chinese characters corresponding to the input syllables and the initial group "jzhz" newly selected are displayed on the first displaying part 11. On the second displaying part 12, the alternatives are displayed of the initial groups in the initial-final table D6. When the user pushes the button "j?" to select the initial-final group "j?," the displaying parts 11 and 12 are switched to the state shown as P09.

In the state P09, both the Chinese characters corresponding to the input syllables and the selected initial-final group "j?" on the first displaying part 11. On the second displaying part 12, the alternatives are displayed of syllables in the syllable table D61. When the user pushes the button "ji" to select the syllable "ji," the displaying parts 11 and 12 are switched to the state shown as P10.

In the state P10, the Chinese characters are displayed corresponding to the syllables "dianhuaji" which mean a telephone set on the first displaying part 11. On the second displaying part 12, the alternatives of the initial groups in the initial table D are displayed for the next input of a syllable.

That is, the syllable "dian" is specified only by "dt," "di*," and "dian" being selected with three keystrokes. Then, the syllable "hua" is specified only by "gkh," "hu*," and "hua" being selected with three keystrokes. Further, the syllable "ji" is specified only by "jzhz," "j?," and "ji" being selected with three keystrokes.

As described above, three keystrokes specify any syllable corresponding to the standard pronunciation of a Chinese character prescribed in GB2312. The Chinese characters which are not prescribed in GB2312 are also acceptable for input, only provided that some special syllables are added in addition to m, n, hng, ng, and yo(io).

It should be noted that the Chinese input program according to the embodiment realizes the input procedure based on the initial classifying method of this invention, which is developed by taking account of the final classifying method according to the Chinese phonology as fully as possible. The procedure hence is natural and user-friendly for the users who speak and use the Chinese language. In other words, the Chinese speaking users easily learn the input procedure to utilize.

Figure 26:
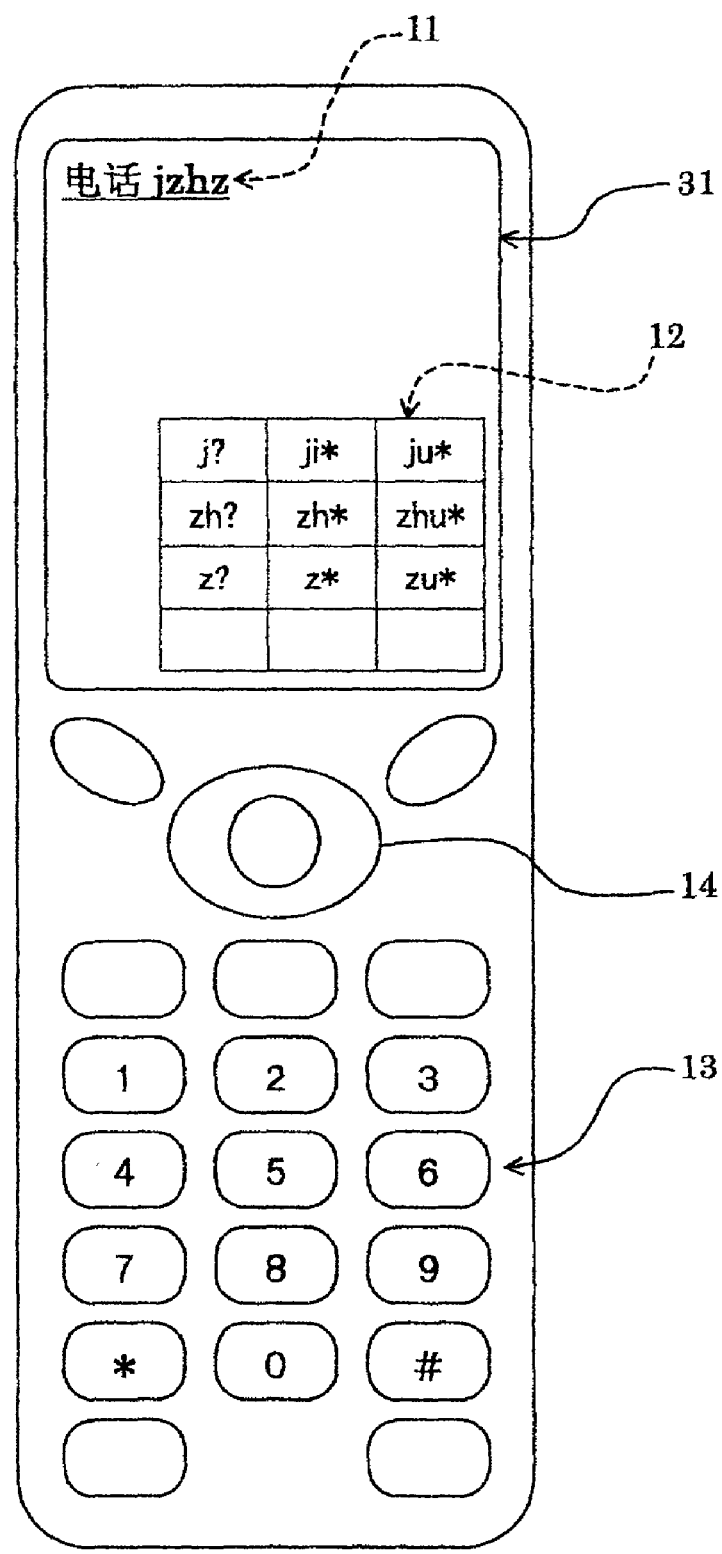
FIG. 26 is a diagram showing a schematic view of a popular type cellular phone.

The cellular phone shown in FIGS. 1 and 2 is that with a touch pad. This invention is also applicable to ordinary cellular phones. FIG. 26 is a diagram showing a schematic view of a popular type cellular phone, which has merely one liquid crystal display 31. With this architecture, items to be displayed, including the first displaying part 11 for displaying what is input and the second displaying part 12 for displaying the buttons of alternatives, should be arranged within the screen of the display 31. The user is able to input the Chinese language in the same manner as described above, by pushing the numeric keys equivalent to the input part 13 with reference to what is displayed corresponding to that on the displaying part 12.

Second Embodiment

The second embodiment of the present invention adopts the configuration according to the first embodiment characterized in that the Chinese input program with the input module is implemented for determining a syllable by two to four keystrokes. A user of a cellular phone with the Chinese input program operates the phone to get in the Chinese input mode, and can determine a syllable of the Chinese language by two to four keystrokes.

In this embodiment, times of keystrokes to determine a syllable differ according to whether the syllable's final is a simple final, a complex final without a head vowel (2nd final group), or a complex final with a head vowel (3rd to 5th final groups). In other words, a syllable including a simple final is inputted by two keystrokes, a syllable including a complex final without a head vowel is inputted by three keystrokes, and a syllable including a complex final with a head vowel is inputted by four keystrokes.

Figure 27:
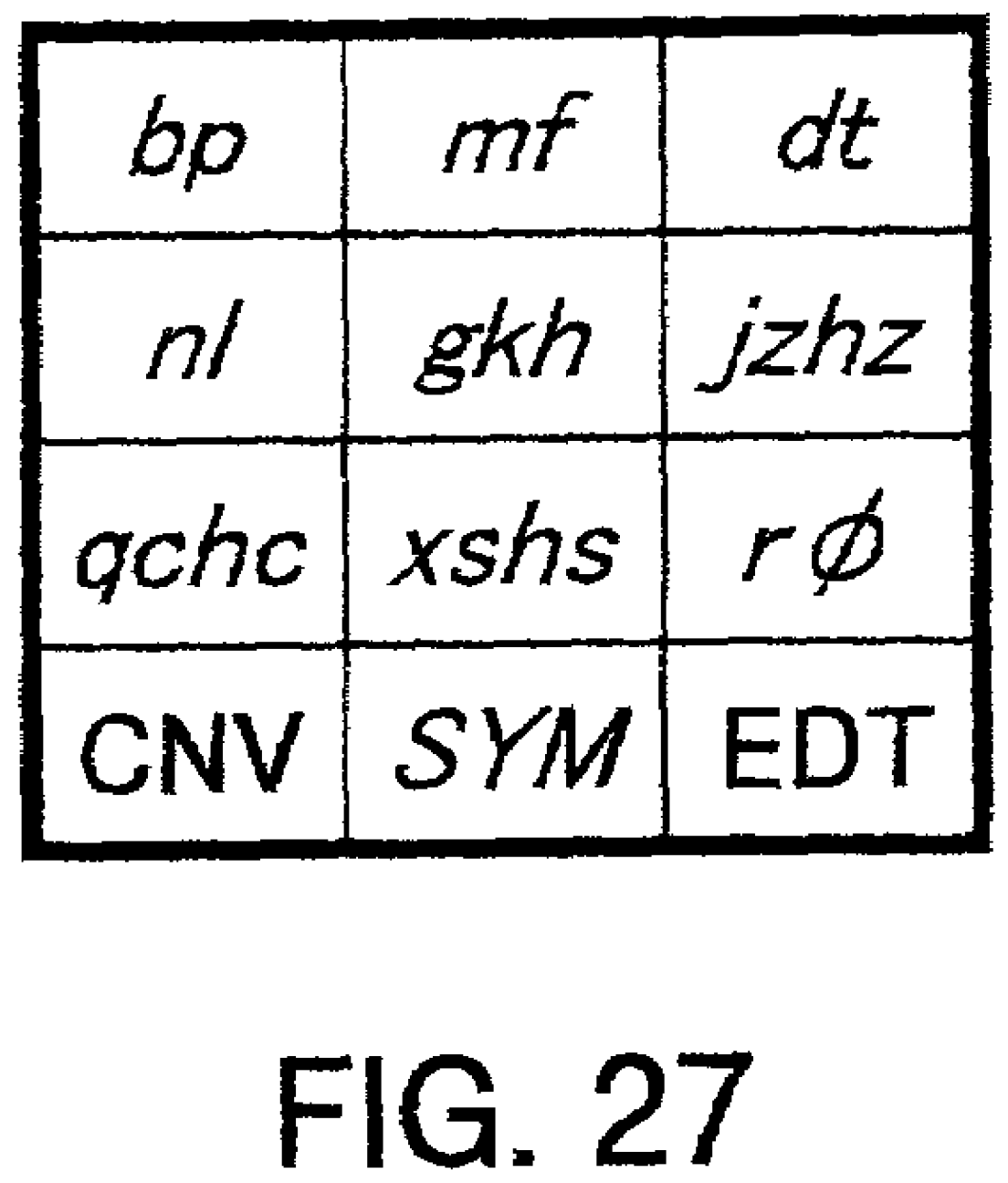

FIG. 27 is a schematic diagram showing the initial screen in the Chinese input mode according to this embodiment. When the cellular phone according to the embodiment is switched to the Chinese input mode, the second displaying part 12 is brought to a state as shown in FIG. 27. In the respective positions where 1, 2, 3, 4, 5, 6, 7, 8, 9, *, 0, and # are displayed in FIG. 4, "bp," "mf," "dt," "nl," "gkh," "jzhz," "qchc," "xshs," "rφ," "CNV," "SYM," and "EDT" are displayed in FIG. 27. Among those, the "bp,""mf," "dt," "nl," "gkh," "jzhz," "qchc," "xshs" and "rφ" buttons correspond to the first through ninth initial groups, respectively. The user selects one of the initial groups by the first keystroke. It should be noted that the user presses the "rφ" button to enter a syllable composed only of a final (a syllable with zero initial).

After the first keystroke, the second displaying part 12 is brought to one of states shown in FIG. 28. More specifically, when "bp" is selected by the first keystroke, "b," "ba," "bo," "bi," "bu," "p," "pa," "po," "pi," and "pu" are displayed on the displaying part 12. That is, the initials, "b" and "p," and syllables including simple finals, "ba," "bo," "bi," "bu," "pa," "po," "pi," and "pu" are displayed. When the syllable for input includes a simple final, the user can determine the syllable by pressing the corresponding button. When the syllable for input includes a complex final, the user specifies the initial by pressing the button "b" or "p."

In FIG. 28, only buttons "b" and "p" are italicized. The button being italicized indicates that the keystroke of the same button is insufficient to determine the syllable. The button not being italicized indicates that the keystroke of the same button determines the syllable.

When "mf" is selected by the first keystroke, "m," "ma," "mo," "me," "mu," "f," "fa," "fo," and "fu" are displayed on the displaying part 12. That is, the initials, "m" and "f," and syllables including simple finals, "ma," "mo," "me," "mi," "mu," "fa," "fo," and "fu" are displayed. When the syllable for input includes a simple final, the user can determine the syllable by pressing the corresponding button. When the syllable for input includes a complex final, the user specifies the initial by pressing the button "m" or "f."

When "dt" is selected by the first keystroke, "d," "da," "de," "di," "du," "t," "ta," "te," "ti," and "tu" are displayed on the displaying part 12. That is, the initials, "d" and "t,"

and syllables including simple finals, "da," "de," "di," "du," "ta," "te," "ti," and "tu" are displayed. When the syllable for input includes a simple final, the user can determine the syllable by pressing the corresponding button. When the syllable for input includes a complex final, the user specifies the initial by pressing the button "d" or "t."

When "nl" is selected by the first keystroke, "n," "na," "ne," "ni," "nu," "nv," "l," "la," "le/lo," "li," "lu," and "lv" are displayed on the displaying part 12. That is, the initials, "n" and "l," and syllables including simple finals, "na," "ne," "ni," "nu," "nv," "la," "le/lo," "li," "lu," and "lv" are displayed. It should be noted that "le/lo" indicates "le" or "lo." When the syllable for input includes a simple final, the user can determine the syllable by pressing the corresponding button. When the syllable for input includes a complex final, the user specifies the initial by pressing the button "n" or "l."

When "gkh" is selected by the first keystroke, "g," "ga," "ge," "gu," "k," "ka," "ke," "ku," "h," "ha," "he," and "hu" are displayed on the displaying part 12. That is, the initials, "g," "k," and "h," and syllables including simple finals, "ga," "ge," "gu," "ka," "ke," "ku," "ha," "he," and "hu" are displayed. When the syllable for input includes a simple final, the user can determine the syllable by pressing the corresponding button. When the syllable for input includes a complex final, the user specifies the initial by pressing the button "g," "k," or "h."

When "jzhz" is selected by the first keystroke, "ji," "ju," "j/zh," "zha," "zhe," "zhi," "zhu," "z," "za," "ze," "zi," and "zu" are displayed on the displaying part 12. That is, the initials, "j/zh" and "z," and syllables including simple finals, "ji," "ju," "zha," "zhe," "zhi," "zhu," "za," "ze," "zi," and "zu" are displayed. It should be noted that "j/zh" indicates "j" or "zh." When the syllable for input includes a simple final, the user can determine the syllable by pressing the corresponding button. When the syllable for input includes a complex final, the user selects the initial by pressing the button "j/zh" or "z."

When "qchc" is selected by the first keystroke, "qi," "qu," "q/ch," "cha," "che," "chi," "chu," "c," "ca," "ce," "ci," and "cu" are displayed on the displaying part 12. That is, the initials, "q/ch" and "c," and syllables including simple finals, "qi," "qu," "cha," "che," "chi," "chu," "ca," "ce," "ci," and "cu" are displayed. It should be noted that "q/ch" indicates "q" or "ch." When the syllable for input includes a simple final, the user can determine the syllable by pressing the corresponding button. When the syllable for input includes a complex final, the user selects the initial by pressing the button "q/ch" or "c."

When "xshs" is selected by the first keystroke, "xi," "xu," "x/sh," "sha," "she," "shi," "shu," "s," "sa," "se," "si," and "su" are displayed on the displaying part 12. That is, the initials, "x/sh" and "s," and syllables including simple finals, "xi," "xu," "sha," "she," "shi," "shu," "sa," "se," "si," and "su" are displayed. It should be noted that "x/sh" indicates "x" or "sh." When the syllable for input includes a simple final, the user can determine the syllable by pressing the corresponding button. When the syllable for input includes a complex final, the user selects the initial by pressing the button "x/sh" or "s."

When "rϕ" is selected by the first keystroke, "r," "re," "ri" "ru," "'," "a," "o/e," "e," "yi," "wu," "yu," and "er" are displayed on the displaying part 12. That is, the initial "r" and the zero initial "'," and syllables including simple finals, "re," "ri", "ru," "a," "o/^e," "e," "yi," "wu," "yu," and "er" are displayed. It should be noted that "o/^e" indicates "o" or "^e." When the syllable for input includes a simple final, the user can determine the syllable by pressing the corresponding button. When the syllable for input includes a complex final, the user specifies the initial by pressing the button of the initial "r" or the button of the zero initial "'."

When "SYM" is selected by the first keystroke, buttons for input of symbols are displayed on the displaying part 12. When "CNV" or "EDT" is selected by the first keystroke, the cellular phone is switched into the conversion or editing mode.

As described above, each syllable including a simple final is entered by two keystrokes. On the other hand, each syllable including a complex final is entered by three or four keystrokes. More specifically, each syllable without a head vowel is entered by three keystrokes, and each syllable with a head vowel is entered by four keystrokes. The input of a syllable including a complex final will be explained bellow.

Figure 29:
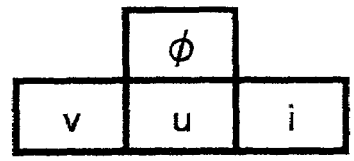
FIG. 29 is a schematic diagram showing input of a syllable including complex final according to the second embodiment of the present invention.

FIG. 29 is an explanatory diagram showing input of the syllable composed of the initial b or p and a complex final. When the user presses the button "bp" at the initial state ((0)-time-keystroke), the displaying part 12 is brought to the state of (1)-time-keystroke. In that state, when the button "b" or "p" is pressed, the displaying part 12 is brought to the state of (2)-time-keystroke.

More specifically, when "b" is selected by the second keystroke, syllables each including the final of the second final group, "bai," "bei," "bao," "ban," "ben," "bang," and "beng" are displayed on the displaying part 12. When the syllable for input includes the final of the second final group, the user can determine the same syllable by selecting desired one of the syllables at the third keystroke. The "0" button (displayed with the syllables including finals of the second final group) is used for input of the special syllables.

At the aforementioned state of (2)-time-keystroke, any syllable including a complex final with a head vowel is not displayed. In that state, the cursor 14 is used for input of a syllable including a complex final with a head vowel. The right, downward, and left directions of the cursor 14 are assigned to the head vowels i, u, and v, respectively. The upward direction is assigned to designation of no head vowel. It is preferable that guidance showing the assignment of the cursor 14 is presented to the users.

In the state of (2)-time-keystroke, when the right direction of the cursor 14 is designated, the syllables each starting with bi, i.e. "bie," "biao," "bian," "bin," and "bing" are displayed, and the state is switched to that of (3)-time-keystroke. The user can determine the syllable by selecting the desired one of the syllables each starting with bi at the forth keystroke.

In the state of (3)-time-keystroke, when the upward direction of the cursor 14 is designated, the displaying part 12 is brought back to the state of (2)-time-keystroke (b selected). When the user, for instance, designates the head vowel i in error, can return the state to that for input of a syllable including a final of the second final group by newly designating no head vowel.

When "p" is selected by the second keystroke, syllables each including the final of the second final group, "pai," "pei," "pao," "pou," "pan," "pen," "pang," and "peng" are displayed on the displaying part 12. When the syllable for input includes the final of the second final group, the user can determine the same syllable by selecting desired one of the syllables at the third keystroke. On the other hand, in the state of (2)-time-keystroke, when the right direction of the cursor 14 is designated, the syllables each starting with pi, i.e. "pie," "piao," "pian," "pin," and "ping" are displayed, and the state is switched to that of (3)-time-keystroke. The user can determine the syllable by selecting the desired one of the syllables each starting with pi at the forth keystroke.

Figure 30:
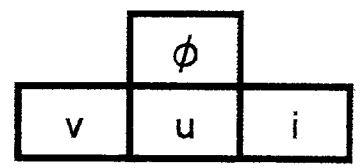
FIG. 30 is a schematic diagram showing input of a syllable including complex final according to the second embodiment of the present invention.

FIG. 30 is an explanatory diagram showing input of the syllable composed of the initial m or f and a complex final. When the user presses the button "mf" at the initial state ((0)-time-keystroke), the displaying part 12 is brought to the state of (1)-time-keystroke. In that state, when the button "m" or "f" is pressed, the displaying part 12 is brought to the state of (2)-time-keystroke.

More specifically, when "m" is selected by the second keystroke, syllables each including the final of the second final group, "mai," "mei," "mao," "mou," "man," "men," "mang," and "meng" are displayed on the displaying part 12. When the syllable for input includes the final of the second final group, the user can determine the same syllable by selecting desired one of the syllables at the third keystroke. On the other hand, in the state of (2)-time-keystroke, when the right direction of the cursor 14 is designated, the syllables each starting with mi, i.e. "mie," "miao," "miu," "mian," "min," "and "ming" are displayed, and the state is switched to that of (3)-time-keystroke. The user can determine the syllable by selecting the desired one of the syllables each starting with mi at the forth keystroke.

When "f" is selected by the second keystroke, syllables each including the final of the second final group, "fei," "fou," "fan," "fen," "fang," and "feng" are displayed on the displaying part 12. When the syllable for input includes the final of the second final group, the user can determine the same syllable by selecting desired one of the syllables at the third keystroke.

Figure 31:
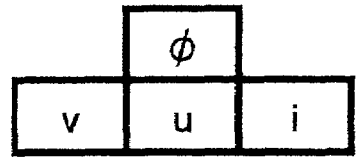
FIG. 31 is a schematic diagram showing input of a syllable including complex final according to the second embodiment of the present invention.

FIG. 31 is an explanatory diagram showing input of the syllable composed of the initial d or t and a complex final. When the user presses the button "dt" at the initial state ((0)-time-keystroke), the displaying part 12 is brought to the state of (1)-time-keystroke. In that state, when the button "d" or "t" is pressed, the displaying part 12 is brought to the state of (2)-time-keystroke.

More specifically, when "d" is selected by the second keystroke, syllables each including the final of the second final group, "dai," "dei," dao," "dou," "dan," "dang," "deng," and "dong" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with di, i.e. "dia" "die," "diao," "diu," "dian," and "ding" are displayed, and the state is switched to that of (3)-time-keystroke. The user can determine the syllable by selecting the desired one of the syllables each starting with di at the forth keystroke. In the state of (2)-time-keystroke, when the downward direction of the cursor 14 is designated, the syllables each starting with du, i.e. "duo," "dui," "duan," and "dun" are displayed. Note that parenthesized "dong" is also displayed according to Bopomofo. And the state is switched to that of (3)-time-keystroke. The user can determine the syllable by selecting the desired one of the syllables each starting with du at the forth keystroke.

When "t" is selected by the second keystroke, syllables each including the final of the second final group, "tai," "tei," "tao," "tou," "tan," "tang," "teng," and "tong" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with ti, i.e. "tie," "tiao," "tian," and "ting" are displayed, and the state is switched to that of (3)-time-keystroke. The user can determine the syllable by selecting the desired one of the syllables each starting with ti at the forth keystroke. In the state of (2)-time-keystroke, when the downward direction of the cursor 14 is designated, the syllables each starting with tu, i.e. "tuo," "tui," "tuan," and "tun" are displayed. Note that parenthesized "tong" is also displayed according to Bopomofo. And the state is switched to that of (3)-time-keystroke. The user can determine the syllable by selecting the desired one of the syllables each starting with tu at the forth keystroke.

FIG. 32 is an explanatory diagram showing input of the syllable composed of the initial n or l and a complex final. When the user presses the button "nl" at the initial state ((0)-time-keystroke), the displaying part 12 is brought to the state of (1)-time-keystroke. In that state, when the button "n" or "l" is pressed, the displaying part 12 is brought to the state of (2)-time-keystroke.

More specifically, when "n" is selected by the second keystroke, syllables each including the final of the second final group, "nai," "nei," "nao," "nou," "nan," "nen," "nang," "neng," and "nong" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with ni, i.e. "nie," "niao," "niu," "nian," "nin," "niang," and "ning" are displayed, and the state is switched to that of (3)-time-keystroke. The user can determine the syllable by selecting the desired one of the syllables each starting with ni at the forth keystroke.

In the state of (2)-time-keystroke, when the downward direction of the cursor 14 is designated, the syllables each starting with nu, i.e. "nuo," "nue," and "nuan" are displayed. Note that parenthesized "nong" is also displayed according to Bopomofo. And the state is switched to that of (3)-time-keystroke. The user can determine the syllable by selecting the desired one of the syllables each starting with nu at the forth keystroke.

In the state of (2)-time-keystroke, when the left direction of the cursor 14 is designated, the syllable starting with nv, i.e. "nve," is displayed, and the state is switched to that of (3)-time-keystroke. The user can determine the syllable starting with nv, i.e. "nve," at the forth keystroke.

When "l" is selected by the second keystroke, syllables each including the final of the second final group, "lai," "lei," "lao," "lou," "lan," "lang," "leng," and "long" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with li, i.e. "lia," "lie," "liao," "liu," "lian," "lin," "liang," and "ling" are displayed, and the state is switched to that of (3)-time-keystroke. The user can determine the syllable by selecting the desired one of the syllables each starting with li at the forth keystroke.

In the state of (2)-time-keystroke, when the downward direction of the cursor 14 is designated, the syllables each starting with lu, i.e. "luo," "lue," "luan," and "lun" are displayed. Note that parenthesized "long" is also displayed according to Bopomofo. And the state is switched to that of (3)-time-keystroke. The user can determine the syllable by selecting the desired one of the syllables each starting with lu at the forth keystroke.

In the state of (2)-time-keystroke, when the left direction of the cursor 14 is designated, the syllable starting with lv, i.e. "lve," is displayed, and the state is switched to that of (3)-time-keystroke. The user can determine the syllable starting with lv, i.e. "lve," at the forth keystroke.

FIG. 33 is an explanatory diagram showing input of the syllable composed of the initial g, k, or h and a complex final. When the user presses the button "gkh" at the initial state ((0)-time-keystroke), the displaying part 12 is brought to the state of (1)-time-keystroke. In that state, when the button "g," "k," or "h" is pressed, the displaying part 12 is brought to the state of (2)-time-keystroke.

More specifically, when "g" is selected by the second keystroke, syllables each including the final of the second final group, "gai," "gei," "gao," "gou," "gan," "gen," "gang," "geng," and "gong" are displayed on the displaying part 12. When the syllable for input includes the final of the second final group, the user can determine the same syllable by selecting desired one of the syllables at the third keystroke. On the other hand, in the state of (2)-time-keystroke, when the downward direction of the cursor 14 is designated, the syllables each starting with gu, i.e. "gua," "guo," "guai," "gui," "guan," "gun," and "guang" are displayed. Note that parenthesized "gong" is also displayed according to Bopomofo. And the state is switched to that of (3)-time-keystroke. The user can determine the syllable by selecting the desired one of the syllables each starting with gu at the forth keystroke.

When "k" is selected by the second keystroke, syllables each including the final of the second final group, "kai," "kei," "kao," "kou," "kan," "ken," "kang," "keng," and "kong" are displayed on the displaying part 12. When the syllable for input includes the final of the second final group, the user can determine the same syllable by selecting desired one of the syllables at the third keystroke. On the other hand, in the state of (2)-time-keystroke, when the downward direction of the cursor 14 is designated, the syllables each starting with ku, i.e. "kua," "kuo," "kuai," "kui," "kuan," "kun," and "kuang" are displayed. Note that parenthesized "kong" is also displayed according to Bopomofo. And the state is switched to that of (3)-time-keystroke. The user can determine the syllable by selecting the desired one of the syllables each starting with ku at the forth keystroke.

When "h" is selected by the second keystroke, syllables each including the final of the second final group, "hai," "hei," "hao," "hou," "han," "hen," "hang," "heng," and "hong" are displayed on the displaying part 12. When the syllable for input includes the final of the second final group, the user can determine the same syllable by selecting desired one of the syllables at the third keystroke. On the other hand, in the state of (2)-time-keystroke, when the downward direction of the cursor 14 is designated, the syllables each starting with hu, i.e. "hua," "huo," "huai," "hui," "huan," "hun," and "huang" are displayed. Note that parenthesized "hong" is also displayed according to Bopomofo. And the state is switched to that of (3)-time-keystroke. The user can determine the syllable by selecting the desired one of the syllables each starting with hu at the forth keystroke.

FIG. 34 is an explanatory diagram showing input of the syllable composed of the initial j, zh or z and a complex final. When the user presses the button "jzhz" at the initial state ((0)-time-keystroke), the displaying part 12 is brought to the state of (1)-time-keystroke. In that state, when the button "j/zh" or "z" is pressed, the displaying part 12 is brought to the state of (2)-time-keystroke. Note that "j/zh" indicates "j" or "zh."

More specifically, when "j/zh" is selected by the second keystroke, syllables each including the final of the second final group, "zhai," "zhei," "zhao," "zhou," "zhan," "zhen," "zhang," "zheng," and "zhong" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with ji, i.e. "jia," "jie," "jiao," "jiu," "jian," "jin," "jiang," "jing," and "jiong" are displayed, and the state is switched to that of (3)-time-keystroke. The user can determine the syllable by selecting the desired one of the syllables each starting with ji at the forth keystroke.

In the state of (2)-time-keystroke, when the downward direction of the cursor 14 is designated, the syllables each starting with zhu, i.e. "zhua," "zhuo," "zhuai," "zhui," "zhuan," "zhun," and "zhuang" are displayed. Note that parenthesized "zhong" is also displayed according to Bopomofo. And the state is switched to that of (3)-time-keystroke. The user can determine the syllable by selecting the desired one of the syllables each starting with zhu at the forth keystroke.

In the state of (2)-time-keystroke, when the left direction of the cursor 14 is designated, the syllables each starting with ju, i.e. "jue," "juan," and "jun" are displayed. Note that parenthesized "jiong" is also displayed according to Bopomofo. And the state is switched to that of (3)-time-keystroke. The user can determine the syllable by selecting the desired one of these syllables at the forth keystroke.

When "z" is selected by the second keystroke, syllables each including the final of the second final group, "zai," "zei," "zao," "zou," "zan," "zen," "zang," "zeng," and "zong" are displayed on the displaying part 12. When the syllable for input includes the final of the second final group, the user can determine the same syllable by selecting desired one of the syllables at the third keystroke.

On the other hand, in the state of (2)-time-keystroke, when the downward direction of the cursor 14 is designated, the syllables each starting with zu, i.e. "zuo," "zui," "zuan," and "zun" are displayed. Note that parenthesized "zong" is also displayed according to Bopomofo. And the state is switched to that of (3)-time-keystroke. The user can determine the syllable by selecting the desired one of the syllables each starting with zu at the forth keystroke.

FIG. 35 is an explanatory diagram showing input of the syllable composed of the initial q, ch or c and a complex final. When the user presses the button "qchc" at the initial state ((0)-time-keystroke), the displaying part 12 is brought to the state of (1)-time-keystroke. In that state, when the button "q/ch" or "c" is pressed, the displaying part 12 is brought to the state of (2)-time-keystroke. Note that "q/ch" indicates "q" or "ch."

More specifically, when "q/ch" is selected by the second keystroke, syllables each including the final of the second final group, "chiai," "chiao," "chou," "chan," "chen," "chang," "cheng," and "chong" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with qi, i.e. "qia," "qie," "qiao," "qiu," "qian," "qin," "qiang," "qing," and "qiong" are displayed, and the state is switched to that of (3)-time-keystroke. The user can determine the syllable by selecting the desired one of the syllables each starting with qi at the forth keystroke.

In the state of (2)-time-keystroke, when the downward direction of the cursor 14 is designated, the syllables each starting with chu, i.e. "chuo," "chuai," "chui," "chuan," "chun," and "chuang" are displayed. Note that parenthesized "chong" is also displayed according to Bopomofo. And the state is switched to that of (3)-time-keystroke. The user can determine the syllable by selecting the desired one of the syllables each starting with chu at the forth keystroke.

In the state of (2)-time-keystroke, when the left direction of the cursor 14 is designated, the syllables, "que," "quan," and "qun," are displayed. Note that parenthesized "qiong" is also displayed according to Bopomofo. And the state is switched to that of (3)-time-keystroke. The user can determine the syllable by selecting the desired one of these syllables at the forth keystroke.

When "c" is selected by the second keystroke, syllables each including the final of the second final group, "cai," "ao," "cou," "can," "cen," "cang," "ceng," and "cong" are displayed on the displaying part 12. When the syllable for input includes the final of the second final group, the user can determine the same syllable by selecting desired one of the syllables at the third keystroke.

On the other hand, in the state of (2)-time-keystroke, when the downward direction of the cursor 14 is designated, the syllables each starting with cu, i.e. "cuo," "cui," "cuan," and "cun" are displayed. Note that parenthesized "cong" is also displayed according to Bopomofo. And the state is switched to that of (3)-time-keystroke. The user can determine the syllable by selecting the desired one of the syllables each starting with cu at the forth keystroke.

FIG. 36 is an explanatory diagram showing input of the syllable composed of the initial x, sh or s and a complex final. When the user presses the button "xshs" at the initial state ((0)-time-keystroke), the displaying part 12 is brought to the state of (1)-time-keystroke. In that state, when the button "x/sh" or "s" is pressed, the displaying part 12 is brought to the state of (2)-time-keystroke. Note that "x/sh" indicates "x" or "sh."

More specifically, when "x/sh" is selected by the second keystroke, syllables each including the final of the second final group, "shiai," "shei," "shao," "shou," "shan," "shen," "shang," and "sheng" are displayed on the displaying part 12. When the syllable for input includes the final of the second final group, the user can determine the same syllable by selecting desired one of the syllables at the third keystroke.

On the other hand, in the state of (2)-time-keystroke, when the right direction of the cursor 14 is designated, the syllables each starting with xi, i.e. "xia," "xie," "xiao," "xiu," "xian," "xin," "xiang," "xing," and "xiong" are displayed, and the state is switched to that of (3)-time-keystroke. The user can determine the syllable by selecting the desired one of the syllables each starting with xi at the forth keystroke.

In the state of (2)-time-keystroke, when the downward direction of the cursor 14 is designated, the syllables each starting with shu, i.e. "shua," "shuo," "shuai," "shui," "shuan," "shun," and "shuang" are displayed, and the state is switched to that of (3)-time-keystroke. The user can determine the syllable by selecting the desired one of the syllables each starting with shu at the forth keystroke.

In the state of (2)-time-keystroke, when the left direction of the cursor 14 is designated, the syllables, "xue," "xuan," and "xun," are displayed. Note that parenthesized "xiong" is also displayed according to Bopomofo. And the state is switched to that of (3)-time-keystroke. The user can determine the syllable by selecting the desired one of these syllables at the forth keystroke.

When "s" is selected by the second keystroke, syllables each including the final of the second final group, "sai," "sao," "sou," "san," "sen," "sang," "seng," and "song" are displayed on the displaying part 12. When the syllable for input includes the final of the second final group, the user can determine the same syllable by selecting desired one of the syllables at the third keystroke.

On the other hand, in the state of (2)-time-keystroke, when the downward direction of the cursor 14 is designated, the syllables each starting with su, i.e. "suo," "sui," "suan," and "sun" are displayed. Note that parenthesized "song" is also displayed according to Bopomofo. And the state is switched to that of (3)-time-keystroke. The user can determine the syllable by selecting the desired one of the syllables each starting with su at the forth keystroke.

FIG. 37 is an explanatory diagram showing input of the syllable composed of the initial r or the zero initial and a complex final. When the user presses the button "rφ" at the initial state ((0)-time-keystroke), the displaying part 12 is brought to the state of (1)-time-keystroke. In that state, when the button "r" or "" is pressed, the displaying part 12 is brought to the state of (2)-time-keystroke.

More specifically, when "r" is selected by the second keystroke, syllables each including the final of the second final group, "rao," "rou," "ran," "ren," "rang," "reng," and "rong" are displayed on the displaying part 12. When the syllable for input includes the final of the second final group, the user can determine the same syllable by selecting desired one of the syllables at the third keystroke.

On the other hand, in the state of (2)-time-keystroke, when the downward direction of the cursor 14 is designated, the syllables each starting with ru, i.e. "ruo," "rui," "ruan," and "run" are displayed. Note that parenthesized "rong" is also displayed according to Bopomofo. And the state is switched to that of (3)-time-keystroke. The user can determine the syllable by selecting the desired one of the syllables each starting with ru at the forth keystroke.

When "" is selected by the second keystroke, syllables each composed of the final of the second final group, "ai," "ei," "ao," "ou," "an," "en," "ang," "eng," and "ong" are displayed on the displaying part 12. When the syllable for input is composed of the final of the second final group, the user can determine the same syllable by selecting desired one of the syllables at the third keystroke.

On the other hand, in the state of (2)-time-keystroke, when the right direction of the cursor 14 is designated, the syllables each starting with y, i.e. "ya," "ye," "yao," "you," "yan," "yin," "yang," "ying," and "yong" are displayed, and the state is switched to that of (3)-time-keystroke. The user can determine the syllable by selecting the desired one of the syllables each starting with y at the forth keystroke.

In the state of (2)-time-keystroke, when the downward direction of the cursor 14 is designated, the syllables each starting with w, i.e. "wa," "wo," "wai," "wei," "wan," "wen," "wang," and "weng" are displayed, and the state is switched to that of (3)-time-keystroke. The user can determine the syllable by selecting the desired one of the syllables each starting with w at the forth keystroke.

In the state of (2)-time-keystroke, when the left direction of the cursor 14 is designated, the syllables, "yue," "yuan,"

and "yun," are displayed. Note that parenthesized "yong" is also displayed according to Bopomofo. And the state is switched to that of (3)-time-keystroke. The user can determine the syllable by selecting the desired one of these syllables at the forth keystroke.

As described above, the first keystroke selects one of initial groups. This is similar to the first embodiment. When the syllable for input includes a simple final, the second keystroke determines the same syllable. On the other hand, when the syllable for input includes a complex final, the second keystroke only specifies the initial of the same syllable. Then, in the case that the syllable for input includes the final of the second final group, the third keystroke determines the same syllable. In the case that the syllable for input includes the final of the third, fourth, or fifth final group, the third keystroke designates the head vowel of the same final. After the designation of the head vowel, the fourth keystroke determines the syllable including the final of the third, fourth, or fifth final group.

The conversion to a Chinese character will be described below. The Chinese input mode for input of Chinese language is further classified into the phonetic input mode for input phonetic symbols according to Pinyin or Bopomofo, the conversion mode for conversing the inputted phonetic symbols to a Chinese character, and the document editing mode for editing strings of inputted Chinese characters. The phonetic input mode is switched to the conversion mode, when the button "CNV" is pressed which is shown in FIG. 27 corresponding to the initial state of the phonetic input mode.

Figure 38:
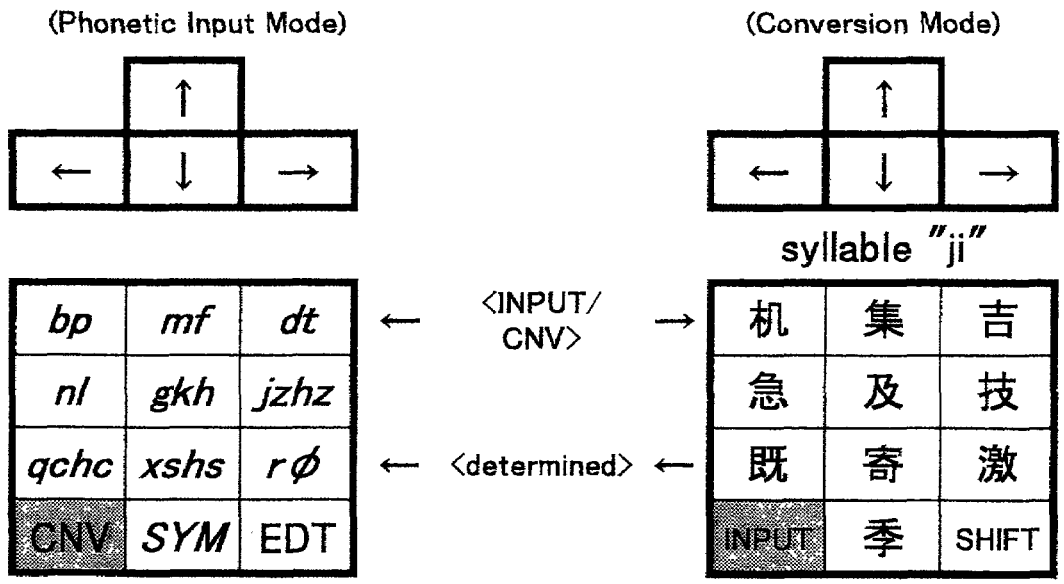
FIG. 38 is a schematic diagram showing switching between the phonetic input mode and the Chinese character conversion mode.

FIG. 38 is the explanatory diagram showing the switch between the phonetic input and conversion modes. The phonetic input mode is switched to the conversion mode, when the button "CNV" is pressed which is displayed in the initial state of the phonetic input mode. In the conversion mode, the characters corresponding to the phonetic symbols (syllable) which have already inputted, are displayed on the displaying part 12 as ten buttons. The user can determine the character by selecting desired one of the displayed characters. After the determination of the character, the conversion mode is switched to the phonetic input mode.

In the conversion mode, besides the aforementioned characters, the buttons "INPUT" and "SHIFT" are also displayed. When the "INPUT" button is pressed, the conversion mode is switched to the phonetic input mode. The button "SHIFT" is used with the cursor 14.

The cursor 14 is used for designation of the tone and movement of the cursor position. More specifically, until determination of a syllable, the cursor 14 can be used for the designation of the tone. After determination of a syllable, the cursor 14 can be used for moving the cursor position against strings of characters that have already been inputted.

The cursor 14 is used for controlling display of alternative characters. It should be noted that the respective sequence numbers are assigned to the alternative characters in accordance with frequency of use. Among the alternative characters, for instance, ten of them can be displayed together in order of frequency of use. If the alternative characters are more than ten, the user can operate cursor 14 to display the alternative characters that was hidden from view.

More specifically, when the upward direction of the cursor 14 is specified, ten characters with higher frequency of use than the characters which were displayed, are displayed. When the downward direction of the cursor 14 is specified, ten characters with lower frequency of use than the characters which were displayed, are displayed.

In the case that the button "SHIFT" is pressed and the upward direction of the cursor 14 is designated, ten characters with the highest frequency of use are displayed. In the case that the button "SHIFT" is pressed and the downward direction of the cursor 14 is designated, ten characters with the lowest frequency of use are displayed.

If the conversion is made based on a word instead of a character, the user can move the target for selection among those with the same pronunciation to left by a character by designating the left direction of the cursor 14, and move the target to right by a character by designating the right direction of the cursor 14. The user also move the target to left by a word by pressing the button "SHIFT" and designating the left direction of the cursor 14. The user also move the target to right by a word by pressing the button "SHIFT" and designating the right direction of the cursor 14.

Figure 39:
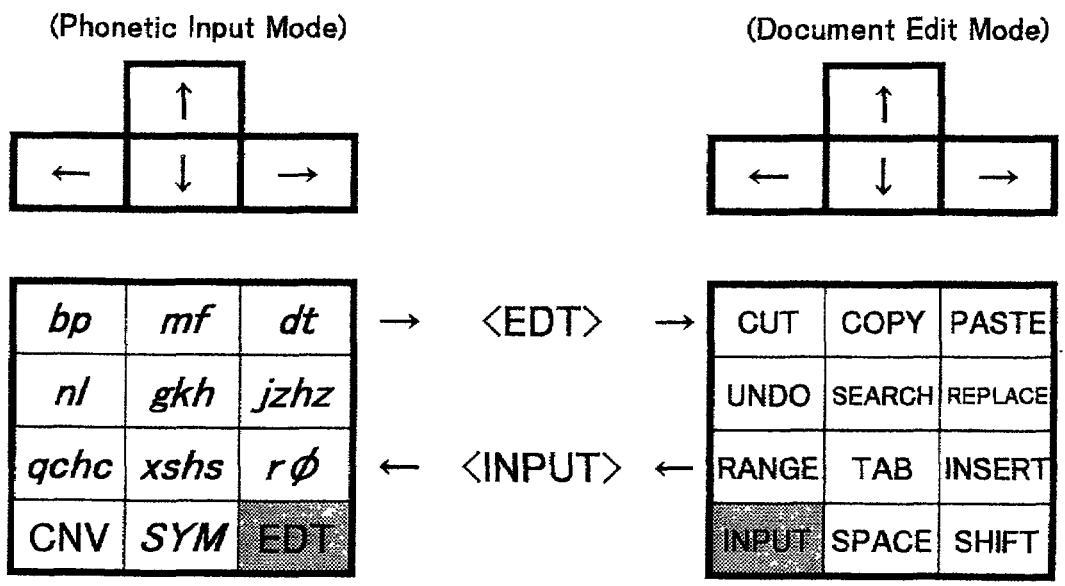
FIG. 39 is a schematic diagram showing switching between the phonetic input mode and the document editing mode.

FIG. 39 is the explanatory diagram showing the switch between the phonetic input and document editing modes. The phonetic input mode is switched to the document input mode, when the button "EDT" is pressed which is displayed in the initial state of the phonetic input mode. In the document editing mode, on the displaying part 12 are shown buttons of "CUT," "COPY," "PASTE," "UNDO," "SEARCH," "REPLACE," "RANGE," "TAB," "INSERT," "INPUT," "SPACE," and "SHIFT." Among these buttons, "CUT," "COPY," "PASTE," "UNDO," "SEARCH," "REPLACE," "RANGE," "TAB," "INSERT," and "SPACE" is used by the user for editing a document in a manner similar to a usual editor program.

The button "INPUT" is used for switching modes. More specifically, the document editing mode is switched to the phonetic input mode when the button "INPUT" is pressed. The button "SHIFT" is used with the cursor 14. More specifically, when the button "SHIFT" is pressed and the left direction of the cursor 14 is designated, the cursor moves to the beginning of a line. When the button "SHIFT" is pressed and the right direction of the cursor 14 is designated, the cursor position moves to the end of a line. When the button "SHIFT" is pressed and the upward direction of the cursor 14 is designated, the cursor position moves to the front of the document. When the button "SHIFT" is pressed and the downward direction of the cursor 14 is designated, the cursor position moves to the end of the document. Further, the user can use functions such as registration of a word, selecting dictionaries, and switch between the simplified and traditional character sets by operating the button "SHIFT" with another button.

The process of the Chinese input program according to the present invention will hereinafter be described with reference to the flowchart in FIG. 40. The process of the flowchart starts when the user switches the mode to the Chinese input mode, and terminates when the user cancels the Chinese input mode. The controller 20 executes phonetic input by switching the input stage among three stages, i.e., initial selecting, simple final selecting, and complex final selecting.

Figure 40:
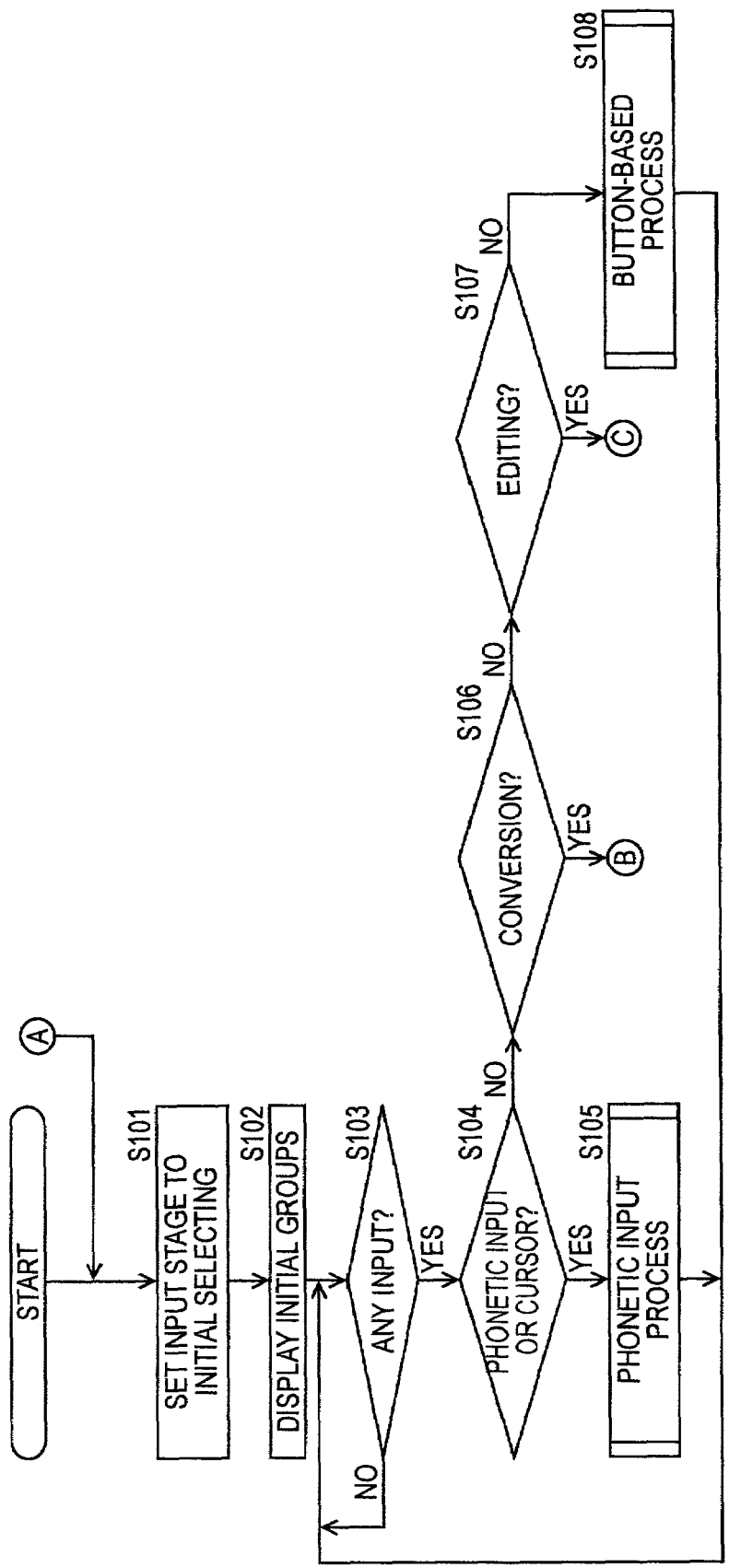
FIG. 40 is a flowchart showing the processing according to the second embodiment of the present invention.
Figure 41:
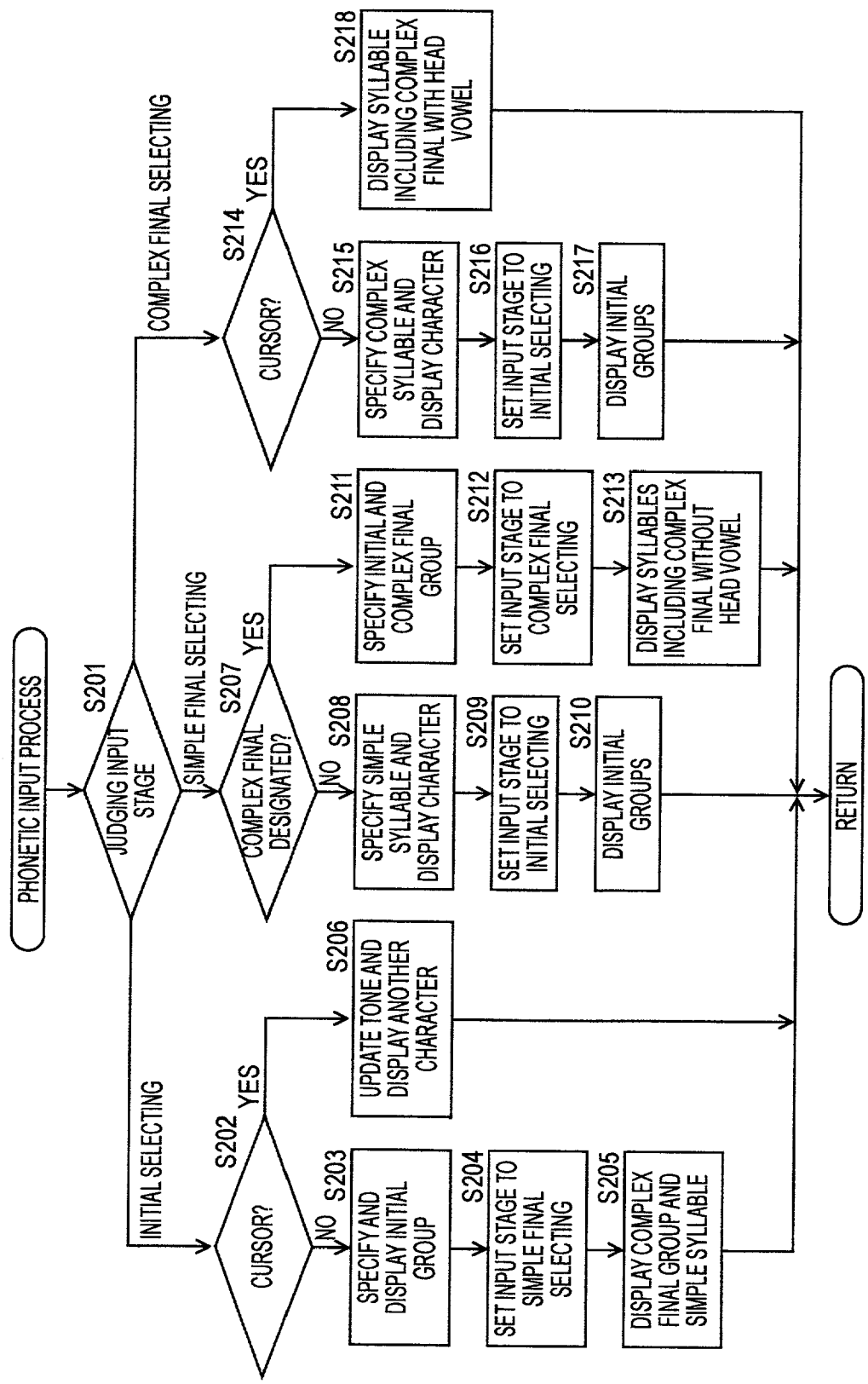
FIG. 41 is a flowchart showing the phonetic input process according to the second embodiment of the present invention.

After the start of the process in FIG. 40, the input stage is set to the initial selecting (S101), and on the displaying part are displayed the initial groups as shown in FIG. 27 (S102). Then, the controller 20 is on standby until the user's input is made (S103). With the input, the processing branches on the basis of which the input is a phonetic input, an operation of the cursor, or another type of input. More specifically, when the input is a phonetic input or an operation of the cursor, the process of the phonetic input, which will be described below with reference to FIG. 41, is executed (S105). After the phonetic input, the processing returns to S103.

Figure 42:
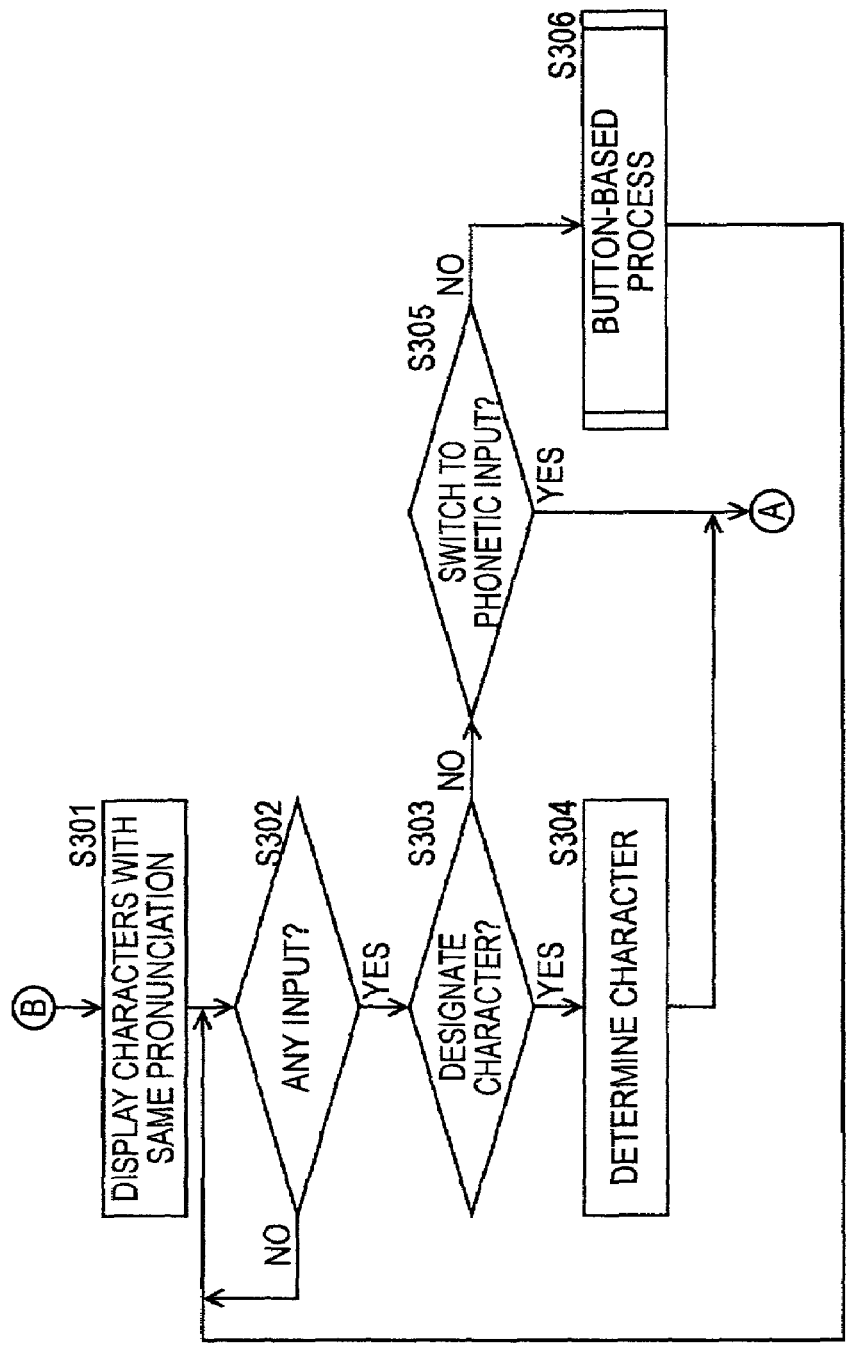
FIG. 42 is a flowchart showing the Chinese character conversion process according to the second embodiment of the present invention.
Figure 43:
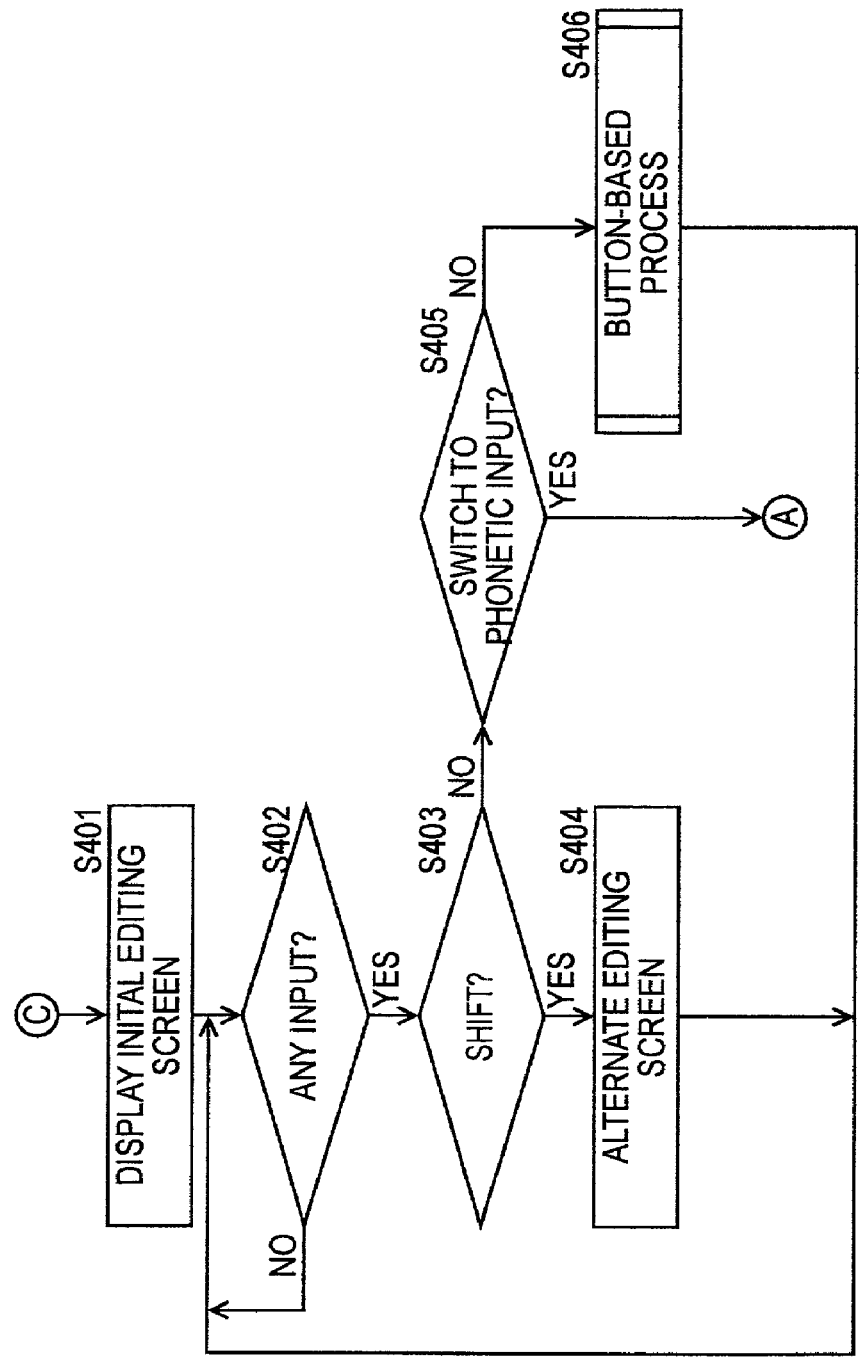
FIG. 43 is a flowchart showing the document editing process according to the second embodiment of the present invention.

When the input is a keystroke to the button "CNV" (S106; Yes), the process of conversion to a Chinese character, which will be described below with reference to FIG. 42, is executed. When the input is a keystroke to the button "EDT" (S107; Yes), the process of editing, which will be described below with reference to FIG. 43, is executed. When the input does not corresponds to the aforementioned inputs, the process corresponding to the same input, which is assigned to the pressed button, is executed (S108).

The phonetic input process will hereinafter described with reference to FIG. 41. To begin with, the processing branches based on the input stage (S201). More specifically, when the input stage is the initial selecting, the controller 20 advances the processing to S202. When the input stage is the simple final selecting, the controller 20 advances the processing to S207. When the input stage is the complex final selecting, the controller 20 advances the processing to S214.

When the input stage is initial selecting, in the case that the input made at the processing in FIG. 40 is not an operation to the cursor 14 (S202; No), the controller 20 specifies the initial group designated by the same input, and displays the initial group on the displaying part 12 (S203). That is, one of those shown in FIG. 28 is displayed. Then, the controller 20 sets the input stage to the simple final selecting (S204), and displays italicized initials of the specified initial group indicating association with complex final groups, and syllables each composed of an initial of the specified initial group and a simple final on the second displaying part 12 (S205). The controller 20 terminates the process of the flowchart in FIG. 41. The processing returns to S103 in FIG. 40.

When the input stage is the simple final selecting, in the case that the input made at the processing in FIG. 40 is not that designating an italicized initial which indicates the combination of an initials of the specified initial group and complex final groups (S207; No), the controller 20 specifies a syllable including a simple final according to the same input, and displays a character corresponding to the syllable on the first displaying part 11 (S208). Then, the controller 20 sets the input stage to initial selecting (S209), and displays the initial groups on the second displaying part 12 (S210). The controller 20 terminates the process of the flowchart in FIG. 41. The processing returns to S103 in FIG. 40.

When the input stage is the simple final selecting, in the case that the input made at the processing in FIG. 40 is that designating an italicized initial which indicates the combination of an initials of the specified initial group and complex final groups (S207; Yes), the controller 20 specifies the combination of an initial and a complex final group according to the same input (S211), sets the input stage to the complex final selecting (S212), and displays syllables each including a final of the second final group (S213). The controller 20 terminates the process of the flowchart in FIG. 41. The processing returns to S103 in FIG. 40.

When the input stage is the complex final selecting, in the case that the input made at the processing in FIG. 40 is not an operation to the cursor 14 (S214; No), the controller 20 specifies a syllable including a complex final according to the same input, and displays a character corresponding to the syllable on the first displaying part 11 (S215). Then, the controller 20 sets the input stage to the initial selecting (S216), and displays the initial groups on the second displaying part 12 (S217). The controller 20 terminates the process of the flowchart in FIG. 41. The processing returns to S103 in FIG. 40.

When the input stage is the complex final selecting, in the case that the input made at the processing in FIG. 40 is an operation to the cursor 14 (S214; Yes), the controller 20 displays syllables each including a complex final with a head vowel according to the direction of the cursor 14 designated by the operation on the second displaying part 12 (S218). The controller 20 terminates the process of the flowchart in FIG. 41. The processing returns to S103 in FIG. 40.

With the aforementioned process, the syllable is determined and a character corresponding to the same syllable is displayed on the first displaying part 11. When the displayed character is different from the desired one (difference of tones), the user can call up the desired character by designating the tone via the cursor 14. The process of the controller 20 when the tone is designated, will hereinafter be described. When the input stage is the initial selecting, in the case that the input made at the processing in FIG. 40 is an operation to the cursor 14 (S202; Yes), the controller 20 deletes the character previously displayed on the first displaying part 11, and displays a character which is pronounced with the tone designated via the cursor 14 on the first displaying part 11 (S206).

The process of the conversion to a Chinese character will hereinafter be described with reference to FIG. 42. The process of conversion is executed, when the input made at the phonetic input mode is the keystroke to the button "CNV" (FIG. 40: S106; Yes). To begin with, the controller 20 displays the characters with the same pronunciation corresponding to the syllable entered by the latest input on the second displaying part 12 (FIG. 42: S301). Then, the controller 20 is on standby until the user's input is made (S302). With the input, the controller 20 causes the processing branch on the basis of whether the input designates a character to confirm the conversion or not (S303).

When the input designates a character (S303; Yes), the controller 20 determines the designated character as that corresponding to the inputted syllable (S304), and returns the processing to S 01 in FIG. 40.

If the conversion is made by a word instead of a character, the controller 20 determines the designated character as that corresponding to the inputted syllable (S304), then, instead of returning the processing to S101 in FIG. 40, displays the alternative characters with the same pronunciation, and returns the processing to S302 to continue the selection of characters.

If the conversion is made by a character, the specification is possible according to which after the determination of the character corresponding to the present syllable (S304), instead of the processing returning to S101 in FIG. 40, the following character is predicted, the alternatives according to the prediction are displayed, and the selection of a character continues.

When the input does not designate a character (S303; No), the controller 20 causes the processing branch on the basis of whether the same input designates the switch to the phonetic input or not (S305). More specifically, in the case that the input designates to the switch to the phonetic input (S305; Yes), the controller 20 returns the processing S101 in FIG. 40. In other cases (S305; No), the process corresponding to the same input is made (S306), and the processing returns to S302.

The process of editing will hereinafter be described with reference to FIG. 43. The process of editing is executed, when the input made at the phonetic input mode is the keystroke to the button "EDT" (FIG. 40: S107; Yes). To begin with, the controller 20 displays the initial screen of the editing mode on the second displaying part 12 (FIG. 43: S401). Then the controller 20 is on standby until the user's input is made (S402). With the input, the controller 20 causes the processing branch on the basis of whether the input is a keystroke to the button "SHIFT" or not (S403).

When the input is a keystroke to the button "SHIFT" (S403; Yes), the controller 20 displays buttons indicating respective editing functions hidden from view of the initial screen (S404), and returns the processing to S402.

When the input is not a keystroke to the button "SHIFT" (S403; No), the controller 20 causes the processing branch on the basis of whether the input designates the switch to the phonetic input mode or not (405). More specifically, in the case the input designates the switch to the phonetic input mode (S405; Yes), the controller 20 returns the processing to S101 in FIG. 40. In other cases (S405; No), the process corresponding to the same input is made (S406), the processing returns to S402.

As described above, the processes of phonetic input, conversion, and editing are executed according to the user's operations. The user can uniquely input a syllable of the Chinese language, select the desired one of the list of the characters each corresponding to the same syllable to determine the character for input, and edit the document composed of the determined characters by operating the cellular phone.

According to the above description, the conversion to a character is made based on the syllable after determination of the same syllable. The Chinese input program according to this embodiment, not restricted to the above description, can convert initials to a word or a phrase when only the initials of respective syllables are inputted.

To input only the initials of syllables, the user selects an initial group by pressing the button including the desired initial for input at the initial state shown in FIG. 27. Then, one of those shown in FIG. 28, which corresponds to the selected initial group, is displayed on the second displaying part 12. In the state, the initials belonging to the selected initial group are assigned to the upward, right, downward, and left directions, respectively. The user can determine the initial for input by operating the cursor 14.

FIG. 44 is an explanatory diagram showing assignment of initials to the cursor. As shown in FIG. 44, for example, when the initial group of dt is selected at the initial screen of the phonetic input (FIG. 27), "d" and "t" are assigned to the upward and right directions of the cursor 14, respectively. When the initial group of gkh is selected, "g," "k," and "h" are assigned to the upward, right, and downward directions of the cursor 14, respectively. When the initial group of jzhz is selected, "j," "zh," and "z" are assigned to the upward, right, and downward directions of the cursor 14, respectively. When another initial group is selected, the assignment is made similar to the above description. It should be noted that when the initial group of rφ is selected, "r," "," "y," and "w" are assigned to the upward, right, downward, and left directions of the cursor 14, respectively.

As the cursor 14 is used in this way, the user can uniquely input an initial by two keystrokes. That is, the first keystroke selects an initial group, and the second keystroke determines an initial.

For instance, to input the Chinese word corresponding to "telephone" which is transcribed into "dian-hua-ji" according to Pinyin, the user selects the initial group of dt, and inputs the initial d by designating the upper direction of the cursor 14. Then, the user selects the initial group of gkh, and inputs the initial h by designating the downward direction of the cursor 14. Further, the user selects the initial group of jzhz, and inputs initial j by designating the upward direction of the cursor 14. With the aforementioned input, the Chinese input program specifies the word composed of Chinese characters corresponding to "telephone" based on the input of d, h, and j, and displays the specified word on the first displaying part 11.

With the Chinese language input method configured as described above, the alternative syllables are narrowed down based on the type of the final of the syllable for input. Consequently, limited times of keystrokes to limited number of keys can determine a syllable of the Chinese language. The unique determination of a syllable can narrow down the alternative characters for conversion, and actualizes the efficient Chinese input. Besides, the Chinese language input program provides the input procedure newly developed based on the phonetics of the Chinese language. Therefore, the users easily learn the procedure to input the Chinese language.

What is claimed is:

1. A program product including a Chinese language input program, said program comprising code segments to control a computer to execute:

a first presentation step of presenting initial groups into which initials of the Chinese language are classified;

a first specifying step of specifying one of the initial groups;

a second presentation step of presenting initials belonging to the specified initial group, and simple syllables comprising one of the initials of the specified initial group and simple finals;

a second specifying step of specifying one of the initials or the simple syllables presented in said second presentation step;

a first definition step of defining, when a simple syllable is specified in said second specifying step, the specified simple syllable as a syllable for input;

a third presentation step of presenting, when an initial is specified in said second specifying step, syllables composed of the specified initial and finals including no head vowel, and head vowels;

a third specifying step of specifying one of the syllables including no head vowel presented in said third presentation step when a syllable for input includes no head vowel, or specifying one of the head vowels presented in said third presentation step when a syllable for input includes a head vowel;

a second definition step of defining, when a syllable including no head vowel is specified in said third specifying step, the specified syllable including no head vowel as a syllable for input;

a fourth presentation step of presenting, when a head vowel is specified in said third specifying step, complex syllables composed of finals including the specified head vowel and the initial specified in said second specifying step; and a third definition step of defining, when said fourth presentation step is executed, one of the complex syllables presented in said fourth presentation step.

2. The program product according to claim 1, wherein said program further comprises a code segment to control the computer to execute a conversion step of obtaining a Chinese character based on the syllable defined in said first, second, or third definition step.

3. The program product according to claim 2, wherein said program further comprises a code segment to control the computer to execute a re-conversion step of obtaining a Chinese character based on a syllable corresponding to the character obtained in said conversion step and a designated tone.

4. The program product according to claim 1, wherein said program further comprises code segments to control the computer to execute:
- a step of determining the initial specified in said second specifying step as an initial for input; and
- a step of obtaining a Chinese character string based on initials determined by said determining step being executed a plurality of times.

5. A Chinese language input apparatus comprising:
- a first input part which accepts designation of one of at least twelve alternatives;
- a second input part which accepts designation of one of at least three alternatives;
- a displaying part for displaying information;
- a controller for executing program-based processing; and
- a storing device contains a Chinese language input program comprising code segments to control the controller to execute:
  - a first presentation step of displaying initial groups into which initials of the Chinese language are classified on said displaying part with said initial groups being related to said first input part;
  - a first specifying step of specifying one of the initial groups based on an operation to said first input part;
  - a second presentation step of displaying initials belonging to the specified initial group, and simple syllables comprising one of the initials of the specified initial group and simple finals, on said displaying part, with said initials of the specified initial group and simple syllables being related to said first input part;
  - a second specifying step of specifying one of the initials or the simple syllables presented in said second presentation step based on an operation to said first input part;
  - a first definition step of defining, when a simple syllable is specified in said second specifying step, the specified simple syllable as a syllable for input;
  - a third presentation step of displaying, when an initial is specified in said second specifying step, syllables composed of the specified initial and finals including no head vowel, and head vowels, on said displaying part, with said syllables being related to said first input part and said head vowels being related to said second input part;
  - a third specifying step of specifying one of the syllables including no head vowel presented in said third presentation step based on an operation to said first input part when a syllable for input includes no head vowel, or specifying one of the head vowels presented in said third presentation step based on an operation to said second input part when a syllable for input includes a head vowel;
  - a second definition step of defining, when a syllable including no head vowel is specified in said third specifying step, the specified syllable including no head vowel as a syllable for input;
  - a fourth presentation step of displaying, when a head vowel is specified in said third specifying step, complex syllables, composed of finals including the specified head vowel and the initial specified in said second specifying step, on said displaying part with said complex syllables being related to said first input part; and
  - a third definition step of defining, when said fourth presentation step is executed, one of the complex syllables presented in said fourth presentation step based on an operation to said first input part.

6. The apparatus according to claim 5, wherein said program further comprises code segments to control the controller to execute:
- an alternative presentation step of displaying Chinese characters for conversion corresponding to the syllable defined in said first, second, or third definition step on said displaying part with said Chinese characters being related to said first displaying part; and
- a character determination step of determining one of said Chinese characters displayed in said alternative presentation step based on an operation to said first input part.

7. The apparatus according to claim 5, wherein said program further comprises a code segment to control the controller to execute:
- an editing function presentation step of displaying identifiers indicating respective functions for editing a document in Chinese language on said displaying part with said identifiers being related to said first input part.

8. A Chinese language input method, comprising:
- a first presentation step of presenting initial groups into which initials of the Chinese language are classified;
- a first specifying step of specifying one of the initial groups;
- a second presentation step of presenting initials belonging to the specified initial group, and simple syllables comprising one of the initials of the specified initial group and simple finals;
- a second specifying step of specifying one of the initials or the simple syllables presented in said second presentation step;
- a first definition step of defining, when a simple syllable is specified in said second specifying step, the specified simple syllable as a syllable for input;
- a third presentation step of presenting, when an initial is specified in said second specifying step, syllables composed of the specified initial and finals including no head vowel, and head vowels;
- a third specifying step of specifying one of the syllables including no head vowel presented in said third presentation step when a syllable for input includes no head vowel, or specifying one of the head vowels presented in said third presentation step when a syllable for input includes a head vowel;
- a second definition step of defining, when a syllable including no head vowel is specified in said third specifying step, the specified syllable including no head vowel as a syllable for input;
- a fourth presentation step of presenting, when a head vowel is specified in said third specifying step, complex syllables composed of finals including the specified head vowel and the initial specified in said second specifying step; and
- a third definition step of defining, when said fourth presentation step is executed, one of the complex syllables presented in said fourth presentation step.

9. The method according to claim 8, further comprising a conversion step of obtaining a Chinese character based on the syllable defined in said first, second, or third definition step.

10. The method according to claim 9, further comprising a reconversion step of obtaining a Chinese character based on a syllable corresponding to the character obtained in said conversion step and a designated tone.

11. The method according to claim 8, further comprising:
a step of determining the initial specified in said second specifying step as an initial for input; and
a step of obtaining a Chinese character string based on initials determined by said determining step being executed plural times.

12. A Chinese language input method, comprising:
presenting initial groups into which initials of the Chinese language are classified;
specifying one of the initial groups;
presenting initials belonging to the specified initial group, and simple syllables comprising one of the initials of the specified initial group and simple finals, in response to the specification of the initial group;
specifying one of the initials or the simple syllables presented in response to the specification of the initial group; and
defining, when a simple syllable is specified, the specified simple syllable as a syllable for input;
wherein no more than fifteen specification choices are presented in any of the presentations.

* * * * *